(12) United States Patent
Shimomura

(10) Patent No.: US 8,638,473 B2
(45) Date of Patent: Jan. 28, 2014

(54) METHOD OF MANUFACTURING IMAGING OPTICAL ELEMENTS AND OPTICAL SCANNING APPARATUS USING IMAGING OPTICAL ELEMENTS MANUFACTURED BY THE METHOD

(75) Inventor: Hidekazu Shimomura, Yokohama (JP)

(73) Assignee: Canon Kabushiki Kaisha (JP)

( * ) Notice: Subject to any disclaimer, the term of this patent is extended or adjusted under 35 U.S.C. 154(b) by 361 days.

(21) Appl. No.: 13/154,146

(22) Filed: Jun. 6, 2011

(65) Prior Publication Data

US 2011/0310410 A1 Dec. 22, 2011

(30) Foreign Application Priority Data

Jun. 17, 2010 (JP) ................................. 2010-138258

(51) Int. Cl.
| | |
|---|---|
| *G06K 15/00* | (2006.01) |
| *G01B 9/00* | (2006.01) |
| *H04N 1/04* | (2006.01) |
| *B29D 11/00* | (2006.01) |
| *G02B 26/08* | (2006.01) |
| *G02B 5/18* | (2006.01) |

(52) U.S. Cl.
USPC ............. 358/1.9; 358/474; 264/1.1; 356/124; 359/205.1; 359/207.7

(58) Field of Classification Search
USPC ...................... 358/1.9, 474; 264/1.1; 356/124; 359/205.1, 207.7
See application file for complete search history.

(56) References Cited

U.S. PATENT DOCUMENTS 7,268,948 B2 * 9/2007 Matsuo et al. ................ 359/575
7,957,046 B2 * 6/2011 Yamaguchi ................ 359/207.7

FOREIGN PATENT DOCUMENTS

| JP | 07-060857 A | 3/1995 |
|---|---|---|
| JP | 2002-248666 A | 9/2002 |

* cited by examiner

*Primary Examiner* — Charlotte M Baker
(74) *Attorney, Agent, or Firm* — Rossi, Kimms & McDowell LLP

(57) ABSTRACT

Provided is a method of manufacturing imaging optical elements which cause a plural light beams to enter a deflection unit, and guide those beams to corresponding surfaces to be scanned, the imaging optical elements being arranged optically at the same position, having the same optical performance, the method including: measuring, with respect to the imaging optical elements having the same optical performance, the optical performance at each of a plurality of positions of the different light beam passing states; calculating a correction shape of an optical functional surface of the imaging optical element based on a deviation amount from a design value of the optical functional surface of the imaging optical element; performing correction processing on a shape of a mirror-finish insert of a mold for molding based on the correction shape of the optical functional surface; and performing molding by using the mirror-finish insert subjected to the correction processing.

15 Claims, 16 Drawing Sheets

METHOD OF MANUFACTURING IMAGING OPTICAL ELEMENTS AND OPTICAL SCANNING APPARATUS USING IMAGING OPTICAL ELEMENTS MANUFACTURED BY THE METHOD

BACKGROUND OF THE INVENTION

1. Field of the Invention

The present invention relates to a method of manufacturing imaging optical elements and to an optical scanning device using the imaging optical elements manufactured by the method of manufacturing imaging optical elements, and is suitable for a color image forming apparatus, in particular, a laser beam printer, a digital copying machine, or a multi-function printer.

2. Description of the Related Art

Hitherto, in an optical scanning device used in an image forming apparatus such as a laser beam printer (LBP), a light beam optically modulated and emitted from a light source unit in accordance with an image signal is periodically deflected with an optical deflector including a rotary polygon mirror (polygon mirror). Then, the deflected light beam is converged into a spot-like shape on a surface of a photosensitive recording medium (photosensitive drum) by an imaging optical system having an fθ characteristic, and the surface thereof has been optically scanned, to thereby effect image recording.

In many cases, plastic lenses, which are easy to manufacture, are used as the imaging optical elements constituting the imaging optical system used in an optical scanning device of this type. The plastic lens has a feature of being easily manufactured by injection molding. In order to achieve preferable curvature of field of light beams condensed onto the surface of a photosensitive drum, to reduce scanning line curvature on the surface of the photosensitive drum, and to achieve a preferable fθ characteristic in the optical scanning device, the shape of the optical functional surface of the plastic lens is often designed to have an aspherical shape. In such a case, by using the injection molding, a desired aspherical shape can be manufactured more easily compared to the case of using optical glass.

When the plastic lens is molded by the injection molding, it is a commonly known fact that the surface shape of the produced lens changes due to molding shrinkage of a plastic. For example, in a case where a lens is molded by using a plastic as a material, the produced lens becomes smaller than the dimensions of a cavity formed of a mirror-finish insert of a mold. In addition, the shape of the optical functional surface is also deformed by the molding shrinkage with respect to the surface shape of the mirror-finish insert. When such error does not fall within a design allowable range, the use of such lenses leads to decrease in optical performance. Examples of the optical performance changes which occur due to the molding shrinkage include focal point deviations in a main scanning direction and a sub scanning direction and an imaging position deviation (irradiation position deviation). In particular, the imaging optical element to be arranged on the side of the surface to be scanned is generally thin and long in the main scanning direction, and is thus susceptible to the effect of unevenness in temperature distribution within the mold. As a result, warp occurs in the imaging optical element. As for the warp of the imaging optical element, an improvement can be expected to some extent by taking such measures as achieving a uniform temperature distribution within the mold. However, it is difficult to completely eliminate the warp of the lens because of the construction of the mold. However, if the amount of deviation from the mold which occurs at the time of molding is stable and does not fluctuate significantly depending on the day and time of the molding and the environment, the shape of the molded product can be made within the design allowable range by correcting the error in advance by means of the mold shape.

Conventionally, there are known methods in which the mirror-finish insert is created by taking into account the shrinkage, the amount of deformation, and the like at the time of molding (Japanese Patent Application Laid-Open No. H07-060857 and Japanese Patent Application Laid-Open No. 2002-248666). The optical element molding method of Japanese Patent Application Laid-Open No. H07-060857 discloses a method in which a lens is once molded to measure the shape error of the optical functional surface thereof, and the mirror-finish insert of the mold is then corrected so as to cancel the shape error caused by the effect of uneven shrinkage of a resin. Further, the optical element manufacturing method of Japanese Patent Application Laid-Open No. 2002-248666 discloses a method in which a part of the shape of the optical functional surface is corrected so as to cancel the curvature of field based on results of measuring optical characteristics.

In a color image forming apparatus serving as an image forming apparatus, there is used an optical scanning device in which a rotary polygon mirror (deflection unit) is shared by a plurality of beams for the purpose of making the entire apparatus compact. In such an optical scanning device, scanning optical systems are arranged on both sides of the deflection unit. Further, in one of the scanning optical systems, two light beams are caused to enter one deflection surface of the deflection unit in oblique directions from above and below with respect to the sub scanning direction. Thus, in the scanning optical system on one side of the deflection unit, two surfaces to be scanned are scanned, and also in the scanning optical system on the other side, two surfaces to be scanned are scanned as well.

The scanning optical system used in such an optical scanning device is provided with an imaging optical system having an fθ characteristic for each of the surfaces to be scanned. In general, the imaging optical system is constituted by a plurality of imaging optical elements. Of the plurality of imaging optical elements constituting the imaging optical system, the imaging optical element arranged on the side of the deflection unit is shared by the two imaging optical systems, and the imaging optical elements arranged on the side of the surfaces to be scanned are used by the respective imaging optical systems. In the two imaging optical systems, the light beams are caused to enter the imaging optical elements in an oblique manner with respect to the sub scanning direction, and hence positions used in the imaging optical elements (positions which the light beams enter) (light beam passing states) vary among the respective imaging optical systems in the sub scanning direction.

In the optical element manufacturing methods disclosed in Japanese Patent Application Laid-Open No. H07-060857 and Japanese Patent Application Laid-Open No. 2002-248666, when the optical elements are manufactured by using the mold, consideration is not given to a fact that even though optical elements are arranged optically at the same position, incident positions of the light beams entering the optical elements are different. In other words, the shape error caused by the effect of the shrinkage of the resin, which differs depending on the incident position of the light beam entering the optical element, is not considered. Accordingly, it is difficult to obtain the mold that cancels the shape error of the optical functional surface for the imaging optical elements to be used in the scanning optical system in which a plurality of light beams is caused to obliquely enter the optical elements in the sub scanning cross-section so as to simultaneously scan a plurality of surfaces to be scanned.

SUMMARY OF THE INVENTION

The present invention has an object to provide a method of manufacturing imaging optical elements, which is capable of manufacturing the imaging optical elements with high precision by injection molding using a mold, the imaging optical elements being used in a scanning optical system in which a plurality of light beams is made to enter a deflection surface from an oblique direction in a sub scanning cross-section so as to scan a plurality of surfaces to be scanned. In addition, the present invention has another object to provide an optical scanning apparatus using the imaging optical elements manufactured by the above-mentioned manufacturing method.

In order to achieve the above-mentioned object, according to the present invention, there is provided a method of manufacturing imaging optical elements which have the same optical performance and are to be used in an optical scanning apparatus, the optical scanning apparatus including: a plurality of light source units; an incident optical system for causing a plurality of light beams emitted from the plurality of light source units to enter the same deflection surface of a deflection unit from an oblique direction with respect to a sub scanning direction; and a plurality of imaging optical systems for guiding the plurality of light beams deflected by the same deflection surface of the deflection unit to respective surfaces to be scanned which correspond to the plurality of light beams, in the plurality of imaging optical systems, such imaging optical elements that are arranged optically at the same position and have the same optical performance being configured to have different light beam passing states in the sub scanning direction, depending on the plurality of light beams corresponding to the respective surfaces to be scanned, the method of manufacturing imaging optical elements, including: measuring, with respect to the imaging optical elements having the same optical performance, the optical performance at each of a plurality of positions of the different light beam passing states; calculating a correction shape of an optical functional surface of the imaging optical element based on a deviation amount from a design value of the optical functional surface of the imaging optical element, the deviation amount being determined based on a plurality of pieces of measurement data obtained in the measurement of the optical performance; performing correction processing on a shape of a mirror-finish insert of a mold for molding, which corresponds to the optical functional surface of the imaging optical element, based on the correction shape of the optical functional surface obtained in the calculation of the correction shape; and performing molding by using the mirror-finish insert subjected to the correction processing.

Note that, in the above-mentioned method of the present invention, the plurality of imaging optical systems can each include a plurality of the imaging optical elements, and the measurement of the optical performance can include measuring, in all light beam passing states, the optical performance of an imaging optical element which is longest in a main scanning direction among the plurality of the imaging optical elements.

Further, the measurement of the optical performance can include evaluating the optical performance in all combinations of the imaging optical elements, in which the light beam passing states are different depending on positions on an optical path along which the imaging optical elements are arranged.

Alternatively, one of the plurality of imaging optical systems of the scanning optical system can have one of no reflecting mirror and an even number of reflecting mirrors arranged among a plurality of the imaging optical elements, and another one of the plurality of imaging optical systems of the scanning optical system can have an odd number of reflecting mirrors arranged among a plurality of the imaging optical elements.

Further, the measurement of the optical performance can include measuring the optical performance of the imaging optical element at a plurality of image heights at a position corresponding to the surface to be scanned, and the calculation of the correction shape can include calculating the correction shape of the mirror-finish insert of the mold based on one of an average value and a center value of the plurality of pieces of the measurement data at each of the plurality of image heights.

Further, the measurement of the optical performance can include measuring the optical performance of the imaging optical element at a plurality of image heights at a position corresponding to the surface to be scanned, and the calculation of the correction shape can include calculating different correction shapes for positions of the mirror-finish insert of the mold, corresponding to the positions of the imaging optical elements through which respective light beams pass, based on the plurality of pieces of the measurement data obtained at the plurality of image heights.

Further, the plurality of pieces of the measurement data, which is obtained with respect to the imaging optical element in a plurality of the light beam passing states in the measurement of the optical performance, can include at least one of a focal point deviation amount in a main scanning direction and a focal point deviation amount in the sub scanning direction on the surface to be scanned.

Further, the plurality of pieces of the measurement data, which is obtained with respect to the imaging optical element in a plurality of the light beam passing states in the measurement of the optical performance, can include an irradiation position deviation amount in a main scanning direction on the surface to be scanned.

Further, the calculation of the correction shape can include analyzing factors each corresponding to the optical performance for each imaging optical element, and calculating the correction shape of the each imaging optical element for each of the factors, based on the plurality of pieces of the measurement data measured with respect to the imaging optical element in a plurality of the light beam passing states in the measurement of the optical performance.

Further, the plurality of pieces of the measurement data, which is obtained with respect to the imaging optical element in a plurality of the light beam passing states in the measurement of the optical performance, can include an irradiation position deviation amount in the sub scanning direction.

Further, according to another aspect of the present invention, there is provided an optical performance evaluation method for imaging optical elements which have the same optical performance and are to be used in an optical scanning device, the optical scanning device including: a plurality of light source units; an incident optical system for causing a plurality of light beams emitted from the plurality of light source units to enter the same deflection surface of a deflection unit from an oblique direction with respect to a sub scanning direction; and a plurality of imaging optical systems for guiding the plurality of light beams deflected by the same deflection surface of the deflection unit to respective surfaces to be scanned which correspond to the plurality of light beams, the imaging optical systems constituting a scanning optical system, in the plurality of imaging optical systems, such imaging optical elements that are arranged optically at the same position and have the same optical performance being configured to have different light beam passing states in the sub scanning direction, depending on the plurality of light beams corresponding to the respective surfaces to be scanned, the optical performance evaluation method including measuring and evaluating the optical performance of the imaging optical element in a plurality of the light beam passing states.

Note that, in the optical performance evaluation method of the present invention, the imaging optical element can be mounted to an optical performance evaluation device by using the same portion as a portion to be mounted to the optical scanning apparatus.

Further, a scanning optical system including an imaging optical element manufactured by the above-mentioned method of manufacturing imaging optical elements is also encompassed in the present invention as a further aspect of the present invention.

Further the present invention also encompasses an optical scanning device including the above-mentioned scanning optical system, and a color image forming apparatus including: the optical scanning apparatus; and a printer controller for converting a color signal input from an external device to pieces of image data on different colors and inputting the pieces of the image data to the optical scanning apparatus.

According to the present invention, the imaging optical elements can be manufactured with high precision by injection molding using a mold, which are to be used in a scanning optical system in which a plurality of light beams is made to enter a deflection surface from an oblique direction in a sub scanning cross-section so as to scan a plurality of surfaces to be scanned.

Further features of the present invention will become apparent from the following description of exemplary embodiments with reference to the attached drawings.

DESCRIPTION OF THE EMBODIMENTS

Figure 1:
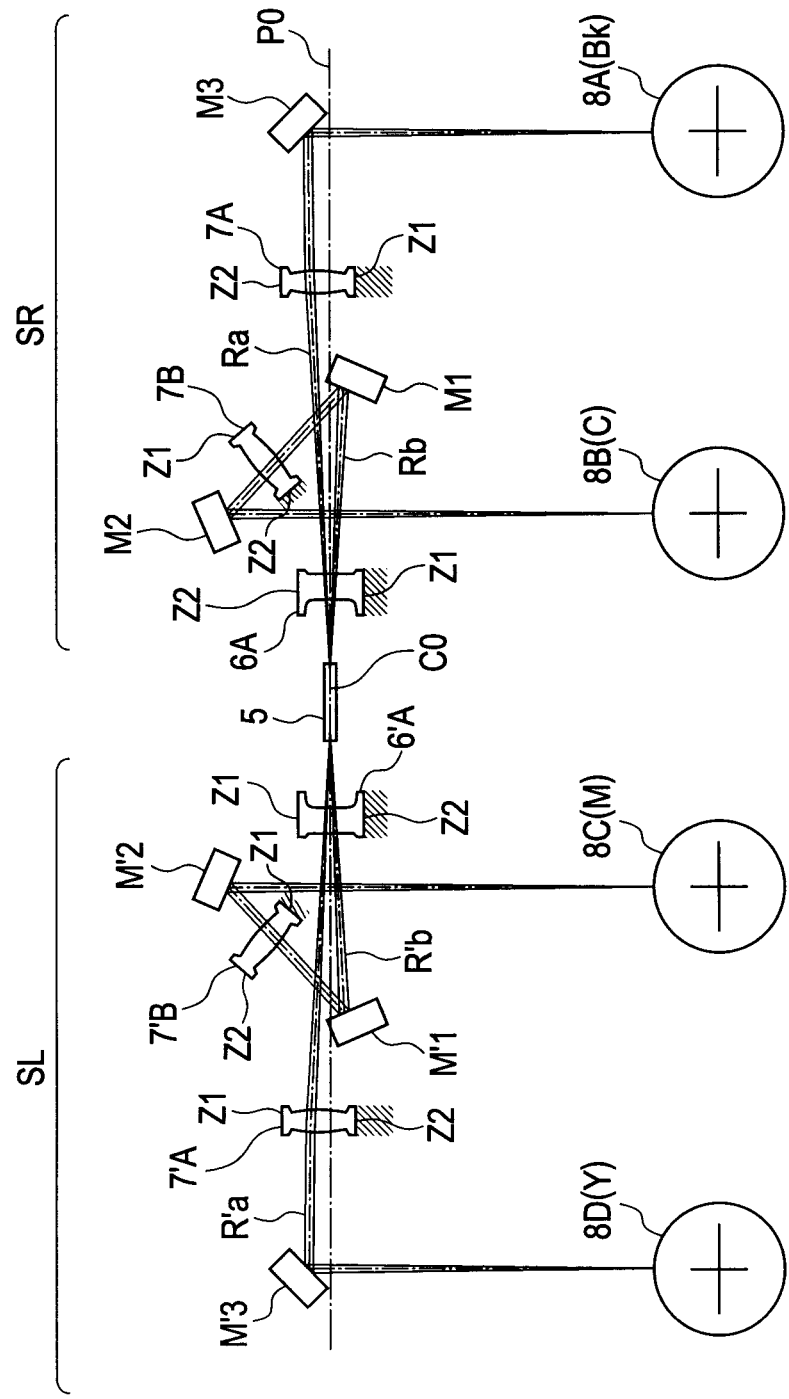
FIG. 1 is a sub scanning sectional view of an optical scanning device according to a first embodiment of the present invention.

In an optical scanning device according to the present invention, a plurality of light beams emitted from a plurality of light source units 1A and 1B is caused to enter the same deflection surface 5a of a deflection unit 5 from an oblique direction with respect to a sub scanning direction via an incident optical system (including collimator lenses 2A and 2B and cylindrical lenses 4A and 4B). A plurality of light beams Ra and Rb deflected on the same deflection surface 5a of the deflection unit 5 is guided, via a plurality of imaging optical systems (including imaging optical elements 6A and 7A and imaging optical elements 6A and 7B, respectively) to surfaces 8A and 8B to be scanned, which correspond to the respective light beams. Among the plurality of imaging optical systems, the imaging optical elements 7A and 7B arranged optically at the same position are different in light beam passing state in the sub scanning direction.

Here, the plurality of imaging optical systems constitutes a part of a scanning optical system SR. Then, the plurality of light beams obtained from the light source units scans the plurality of surfaces 8A and 8B to be scanned, by means of the scanning optical system SR. Here, in a method of manufacturing imaging optical elements according to the present invention, the following steps are employed when the imaging optical elements, which are to be used for the above-mentioned optical scanning device, are manufactured through injection molding using a mold for molding. In the method of manufacturing the imaging optical elements having the same optical performance, there is employed an optical performance measuring step in which the optical performance is measured at each of a plurality of positions of different light beam passing states. Further, there is employed a correction shape calculating step in which a correction shape is calculated based on a deviation amount from a design value of the optical functional surface of the imaging optical element, the deviation amount being determined based on a plurality of pieces of measurement data obtained in the measurement of the optical performance measuring step. Further, there are employed: a correction processing step in which correction processing is performed on the shape of a mirror-finish insert of a mold for molding, which corresponds to the optical functional surface of the imaging optical element, based on the correction shape of the optical functional surface obtained in the correction shape calculating step; and a molding step in which the molding is performed by using the mirror-finish insert subjected to the correction processing in the correction processing step.

In one of the imaging optical systems of the scanning optical system SR used in the optical scanning device according to the present invention, no reflecting mirror or an even number of reflecting mirrors are arranged among a plurality of the imaging optical elements 6A and 7A. Further, in another one of the imaging optical systems, an odd number of reflecting mirrors M1 are arranged among the plurality of the imaging optical elements 6A and 7B. In the optical scanning device according to the present invention, two scanning optical systems SL and SR are arranged on both sides of the deflection unit 5. In the optical performance measuring step, the optical performance of an imaging optical element which is longest in a main scanning direction among the plurality of imaging optical elements is measured in all light beam passing states. Further, the optical performance is evaluated in all combinations of the imaging optical elements, in which the light beam passing states are different depending on positions on an optical path along which the imaging optical elements are arranged. Then, in the optical performance measuring step, the optical performances of the plurality of the imaging optical elements are measured at a plurality of image heights at a position corresponding to the surface to be scanned. In the correction shape calculating step, the correction shape of the mirror-finish insert of the mold is calculated based on an average value or a center value of the plurality of pieces of the measurement data at each of the image heights. Further, in the correction shape calculating step, different correction shapes are calculated for positions of the mirror-finish insert of the mold corresponding to positions of the imaging optical element, through which respective light beams pass, based on the plurality of pieces of the measurement data obtained at the plurality of image heights.

The plurality of pieces of the measurement data, which is obtained with respect to the imaging optical element in the plurality of light beam passing states in the optical performance measuring step, includes at least one of a focal point deviation amount in the main scanning direction and a focal point deviation amount in the sub scanning direction on the surface to be scanned. Alternatively, the plurality of pieces of the measurement data includes an irradiation position deviation amount in the main scanning direction or in the sub scanning direction on the surface to be scanned. In an optical performance evaluation method for imaging optical elements according to the present invention, the optical performance of the imaging optical element is measured and evaluated in the plurality of light beam passing states. On this occasion, the imaging optical element is mounted to an optical performance evaluation device by using the same portion as a portion mounted to the optical scanning device.

[First Embodiment]

Figure 2:
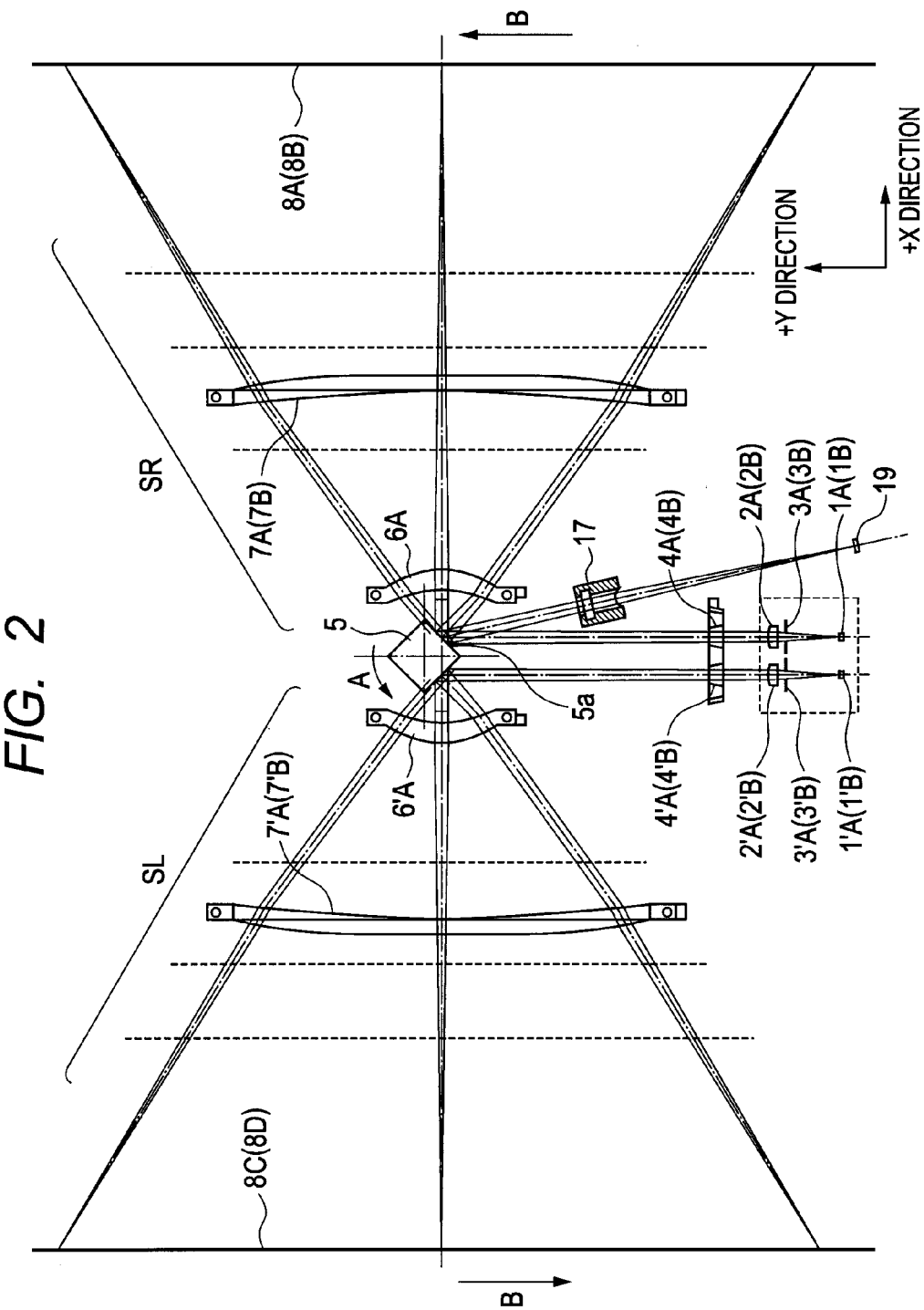
FIG. 2 is a main scanning sectional view of the optical scanning device according to the first embodiment of the present invention.
Figure 3:
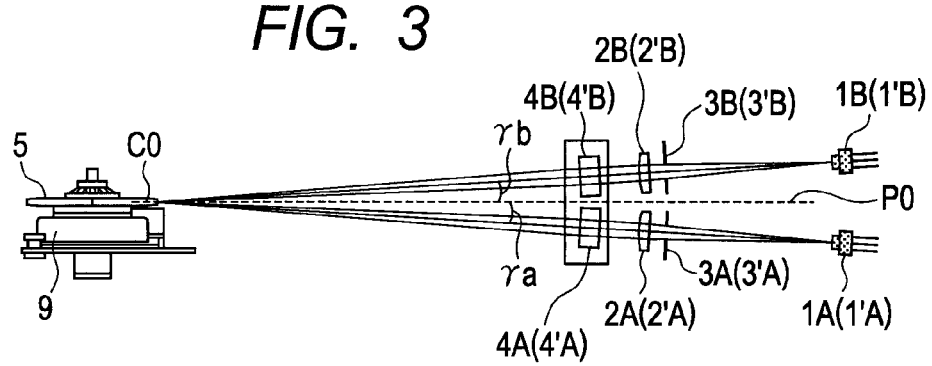
FIG. 3 is a sub scanning sectional view of an incident optical system according to the first embodiment of the present invention.

FIG. 1 is a sub scanning sectional view of the optical scanning device including the imaging optical elements (scan imaging optical elements) manufactured by the manufacturing method of the present invention. FIG. 2 is a main scanning sectional view which illustrates in a developed state, of the optical scanning device of FIG. 1, optical paths of the scanning optical systems SL and SR arranged at left-hand and right-hand stations on both sides of the deflection unit 5. FIG. 3 is a sub scanning sectional view of the incident optical system (including collimator lenses 2 and cylindrical lenses 4) used for the optical scanning device of FIG. 1. Here, the main scanning direction (Y direction) is a direction perpendicular to a rotational axis of the deflection unit 5 and an optical axis (X direction) of the scanning optical systems SR and SL (direction in which the light beam is deflected by the deflection unit (deflected for scanning)). The sub scanning direction (Z direction) is a direction parallel to the rotational axis of the deflection unit 5. Further, a main scanning cross-section is a plane including the optical axis of the scanning optical systems SR and SL and the main scanning direction. A sub scanning cross-section is a cross-section which includes the optical axis of the scanning optical systems SR and SL and is perpendicular to the main scanning cross-section.

The optical scanning device according to this embodiment includes the two stations on the left-hand side and the right-hand side as illustrated in FIG. 1. The two stations are arranged symmetrically with respect to the optical deflector (deflection unit) 5, and hence, in this embodiment, one station is mainly described. Distinction is made between the same components of the respective stations on the left-hand and right-hand sides by marking the same reference symbols with "'".

Referring to FIGS. 2 and 3, the light source units 1A and 1B (1'A and 1'B) (for example, semiconductor lasers 1) emit diverging light beams. The diverging light beams emitted from light emitting portions of the semiconductor lasers 1 are collimated to substantially-parallel light beams by collimator lenses 2A and 2B (2'A and 2'B) (hereinafter, referred to as "collimator lenses 2"), respectively. The collimated substantially-parallel light beams are imaged as a longitudinal line image in the main scanning direction in the vicinity of a deflection surface 5a of the polygon mirror (deflection unit) 5 by cylindrical lenses 4A and 4B (4'A and 4'B) (hereinafter, referred to as "cylindrical lenses 4"), which have power only in the sub scanning direction. Further, aperture stops 3A and 3B (3'A and 3'B) respectively control light beam widths so that desired spot diameters are obtained on surfaces 8 to be scanned (8A, 8B, 8C, and 8D). Note that, the collimator lenses 2 and the cylindrical lenses 4 constitute a part of the incident optical system.

The optical deflector, serving as the deflection unit 5, is formed of, for example, a rotary polygon mirror (polygon mirror), and rotates at a constant speed in a direction indicated by the arrow A of FIG. 2 by a drive unit such as a motor (not shown). The imaging optical elements (scan imaging optical elements) 6A, 7A, and 7B (6'A, 7'A, and 7'B) have an fθ characteristic, and cause the plurality of light beams deflected by the optical deflector (deflection unit) 5 to be imaged in a spot-like shape on the surfaces 8 (8A, 8B, 8C, and 8D) of photosensitive drums (surfaces to be scanned) corresponding to the respective light beams. The imaging optical elements 6A and 7A constitute one imaging optical system. Similarly, the imaging optical elements 6A and 7B constitute one imaging optical system. The two imaging optical systems constitute one scanning optical system SR.

The optical deflector (deflection unit) 5 is rotated in the direction of the arrow A to optically scan the surfaces 8A, 8B, 8C, and 8D of the photosensitive drums in a direction of the arrow B, thereby forming scanning lines and thus effecting image recording. In the scanning optical systems SR and SL, an optical face tangle error of the deflection surface 5a is corrected by achieving, in the sub scanning cross-section, a conjugate relationship between the deflection surface 5a of the optical deflector (deflection unit) 5 or its vicinity and the surfaces 8A to 8D of the photosensitive drums or their vicinities. The imaging optical elements 6A and 6'A are the same lenses, but are arranged at different places in the optical scanning device. Hence, the imaging optical elements 6A and 6'A are denoted by different reference symbols.

The imaging optical element 6A (6'A) is shared by light beams traveling toward the two surfaces 8A and 8B (8C and 8D) to be scanned. Further, the imaging optical elements 7A, 7B, 7'A, and 7'B are the same lenses, but are arranged at different places in the optical scanning device. Hence, the imaging optical elements 7A, 7B, 7'A, and 7'B are distinguished from one another by using different reference symbols. The imaging optical elements 7A and 7B (7'A and 7'B) are arranged optically at the same position. Further, at the respective arrangement positions of the imaging optical elements 7A and 7B (7'A and 7'B), the light beams pass through different positions in the sub scanning direction, and the imaging optical elements 7A and 7B (7'A and 7'B) have different seating surfaces to be described later. Further, a light beam Ra is emitted from the light source (light source unit) 1A, and enters the deflection surface 5a with an oblique incident angle of γa with respect to a plane P0 perpendicular to the rotational axis of the optical deflector (deflection unit) 5. Similarly, a light beam Rb is emitted from the light source (light source unit) 1B, and enters the deflection surface 5a with an oblique incident angle of γb ($|γa|=|γb|$) with respect to the plane P0. The respective components are so configured as to cause the light beams Ra and Rb to intersect each other in a vicinity C0 of the deflection surface 5a in the sub scanning direction. The same applies to light beams emitted from the light sources (light source units) 1'A and 1'B.

Shaded areas illustrated beside the respective imaging optical elements of FIG. 1 each represent a part of a cabinet. Among reference seating surfaces for mounting the imaging optical element, a seating surface on the shaded area side abuts on the cabinet.

In this embodiment, the imaging optical elements 6A, 7A, and 7B (6'A, 7'A, and 7'B) (hereinafter, simply referred to as "imaging optical elements 6 and 7") are plastic lenses manufactured by the injection molding.

As illustrated in FIGS. 9A to 9D, the imaging optical elements 6 and 7 of this embodiment are evaluated for optical performances at a plurality of light beam passing positions under the same light beam passing state as that obtained when the imaging optical elements 6 and 7 are arranged in the optical scanning device. Then, based on the evaluation, the imaging optical elements 6 and 7 are manufactured by using steps (flow) illustrated in FIG. 4. Respective manufacturing steps are briefly described below.

Based on design values obtained by using optical design software or the like, first determined is the shape of a mirror-finish insert, serving as a mold for creating the shape of an optical functional surface of the imaging optical element (lens). The general shape of the mirror-finish insert is formed of stainless tool steel, and then, the surface of the mirror-finish insert which corresponds to the optical functional surface of the lens is plated with a metal having good machining properties, such as Ni, for easier correction processing described below.

The plated portion thus created is cut into an arbitrary shape, thereby completing the mirror-finish insert for initial molding. As to the arbitrary shape, in a case where the shape of the design values and the ratio of shrinkage after molding of a glass material to be used are known, errors from the design values, which occur due to molding shrinkage, can be reduced by multiplying the design values by the ratio of shrinkage. This provides a preferred effect of reducing the amount of plating to be cut for adjusting the mirror-finish insert.

Subsequently, molding is performed by using the manufactured mirror-finish insert (initial molding step). The construction of the mold varies depending on, for example, the pressurizing capacity of a molding machine, the size of the lens, and the number of lenses obtained in one molding cycle (number of cavities). Thus, "stable molding" is not always achieved for all lenses under the same molding conditions. The term "stable molding" used herein means: (i) local deformation (sink mark) does not occur on the optical functional surface; (ii) spot enlargement due to birefringence of the material does not occur; (iii) the shapes of the optical functional surfaces of all cavities are substantially the same; and (iv) the shapes of the optical functional surfaces are substantially constant regardless of day and time of molding.

In order to achieve the above-mentioned "stable molding", molding conditions, such as the pressure applied to lenses at the time of molding (holding pressure), the time period of one cycle of molding (molding takt time), and the internal temperature of the mold (mold temperature), are adjusted for each lens.

Figure 5A:
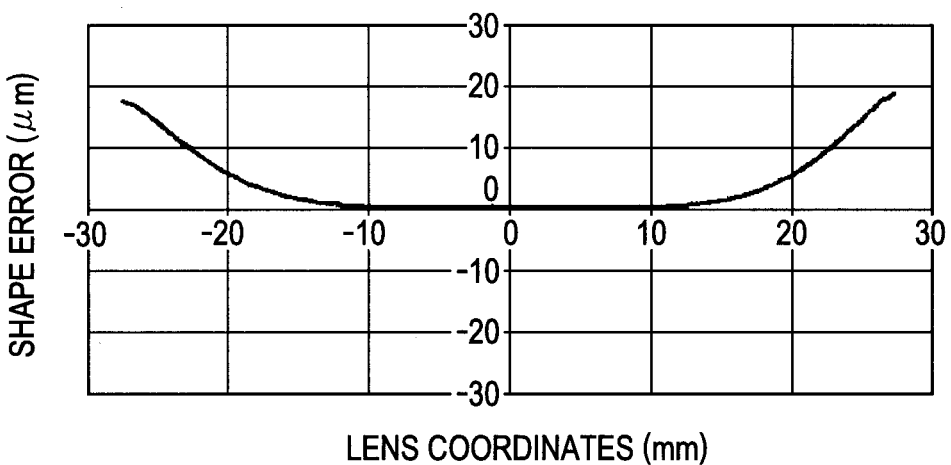
FIG. 5A is a graph showing a shape error in a main scanning direction of an optical functional surface of the imaging optical element.
Figure 5B:
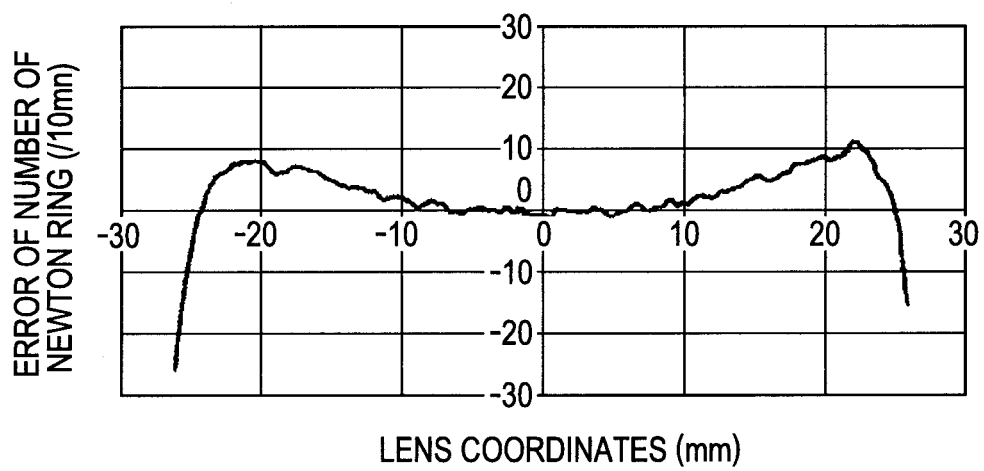
FIG. 5B shows an error in the number of Newton's rings in the main scanning direction.

By adjusting the above-mentioned molding conditions, a first molded product (initial molded product) is obtained. With regard to the initial molded product, for example, the thickness of the central part of the lens, the distance from a reference plane to a surface vertex of the optical functional surface, and the shape of the optical functional surface are measured, and the shape of the lens is thereby evaluated (shape measuring step). In the measurement of the optical functional surface, such a measuring instrument as Form Talysurf (manufactured by Taylor Hobson Ltd.) is used to evaluate the shape with a fine pitch. FIGS. 5A and 5B show an example of the evaluation results. FIG. 5A shows a shape error in the main scanning direction of the optical functional surface actually obtained, relative to the design shape, and shows that the shape error increases with increasing distance from 0 (main scanning shape error). Further, FIG. 5B shows an error in the number of Newton's rings in the main scanning direction (main scanning Newton error). The error is calculated as follows: the measured shape of the optical functional surface in the main scanning direction is subjected to quadratic function fitting in a particular range (for example, a width of 10 mm); a partial curvature is obtained from the second derivative of the function thus obtained; and the error in the number of Newton's rings relative to the partial curvature of the design values is calculated.

Further, an error in the number of Newton's rings from the design values in the sub scanning direction (sub scanning Newton error) is determined as follows: the optical functional surface is divided into a predetermined number of sections (not shown) relative to the main scanning direction; and, in each section, the shape of the sub scanning cross-section in a direction normal to a meridional line of the optical functional surface (line passing through the vertex of the optical functional surface) is measured. In order to calculate such a shape of the mirror-finish insert that corrects the above-mentioned main scanning shape error, main scanning Newton error, and sub scanning Newton error, the error amounts need to be fitted into a function. In this embodiment, the shape of the optical functional surface of the lens is expressed by equations given below. An intersection point between each lens surface and the optical axis is taken as an origin, the optical axis direction is taken as an x axis, an axis orthogonal to the optical axis in the main scanning cross-section is taken as a y axis, and an axis orthogonal to the optical axis in the sub scanning cross-section is taken as an x axis. In this case, the meridional line direction corresponding to the main scanning direction is expressed as follows:

[Math. 1]

$$x = \frac{y^2/R}{1+\sqrt{1-(1+k)y^2/R^2}} + A_2 y^2 + A_4 y^4 + A_6 y^6 + A_8 y^8 + A_{10} y^{10} \quad \text{(Equation 1)}$$

where R represents a curvature radius, and $k$, $A_4$, $A_6$, $A_8$, and $A_{10}$ each represent an aspherical coefficient.

Further, a sagittal line direction corresponding to the sub scanning direction (direction that includes the optical axis and is orthogonal to the main scanning direction) is expressed as follows:

[Math. 2]

$$x = \frac{cz^2}{1+\sqrt{1-c^2 z^2}} \quad \text{(Equation 2)}$$

where $c = c_1 + B_2 Y^2 + B_4 Y^4 + B_6 Y^6 + B_8 Y^8$, $c_1$ represents a sagittal line curvature on the optical axis, and $B_2$, $B_4$, $B_6$, and $B_8$ each represent a coefficient. Note that, a sagittal line curvature c off the optical axis is defined in a plane that includes the normal of the meridional line at its corresponding position and is perpendicular to the main scanning section.

With respect to the design values described above, the following function is used for the fitting of the shape error in the main scanning direction:

$$\Delta x = E_2 Y^2 + E_4 Y^4 + E_6 Y^6 + E_8 Y^8 + E_{10} Y^{10} + E_{12} Y^{12} + E_{14} Y^{14} + E_{16} Y^{16} \quad \text{(Equation 3)}$$

where $E_2$, $E_4$, $E_6$, $E_6$, $E_{10}$, $E^{12}$ ... each represent an aspherical coefficient. Next, the following function is used for the fitting of the error in the number of Newton's rings in the sub scanning cross-section:

[Math. 3]

$$\Delta x = \frac{cz^2}{1+\sqrt{1-c'^2 z^2}} \quad \text{(Equation 4)}$$

where $c' = c_\Delta + F_2 Y^2 + F_4 Y^4 + F_6 Y^6 + F_8 Y^8 + F_{10} Y^{10}$, $c_\Delta$ represents an error in sagittal line curvature on the optical axis, and $F_2$, $F_4$, $F_6$, $F_8$, and $F_{10}$ each represent a coefficient. As described above, the shape error data of the optical functional surface of the initial molded product is subjected to least square approximation by using Equations 3 and 4, thereby achieving function approximation for all the optical functional surfaces. By adding the function thus obtained to the shape function of the original mirror-finish insert, the shapes of all the optical functional surfaces of scanning lenses to be molded next become closer to the shape of the design values (first correction step).

On this occasion, if the ratio of the length in the main scanning direction of the optical functional surface of the molded lens to the length in the main scanning direction of the mirror-finish insert is known, parts concerning the coefficient of Y in Equations 3 and 4 are multiplied by this ratio depending on the order of Y. This is preferred because the shape of the optical functional surface of the molded lens is made closer to the design values. Then, based on the newly obtained function, the mirror-finish insert is reprocessed. On this occasion, along with the correction of the optical functional surface, the relative position of the mirror-finish insert with respect to the mold is adjusted so as to correct the thickness of the central part of the lens and the position of the vertex of the optical functional surface with respect to the reference plane.

Subsequently, with regard to the lens molded by using the reprocessed mirror-finish insert (molded lens), the shape of the optical functional surface is measured, and also, the thickness of the central part of the lens and the position of the vertex of the optical functional surface with respect to the reference plane are measured, to thereby check whether or not the shape errors with respect to the design values fall within an allowable range (optical evaluation).

Figure 6:
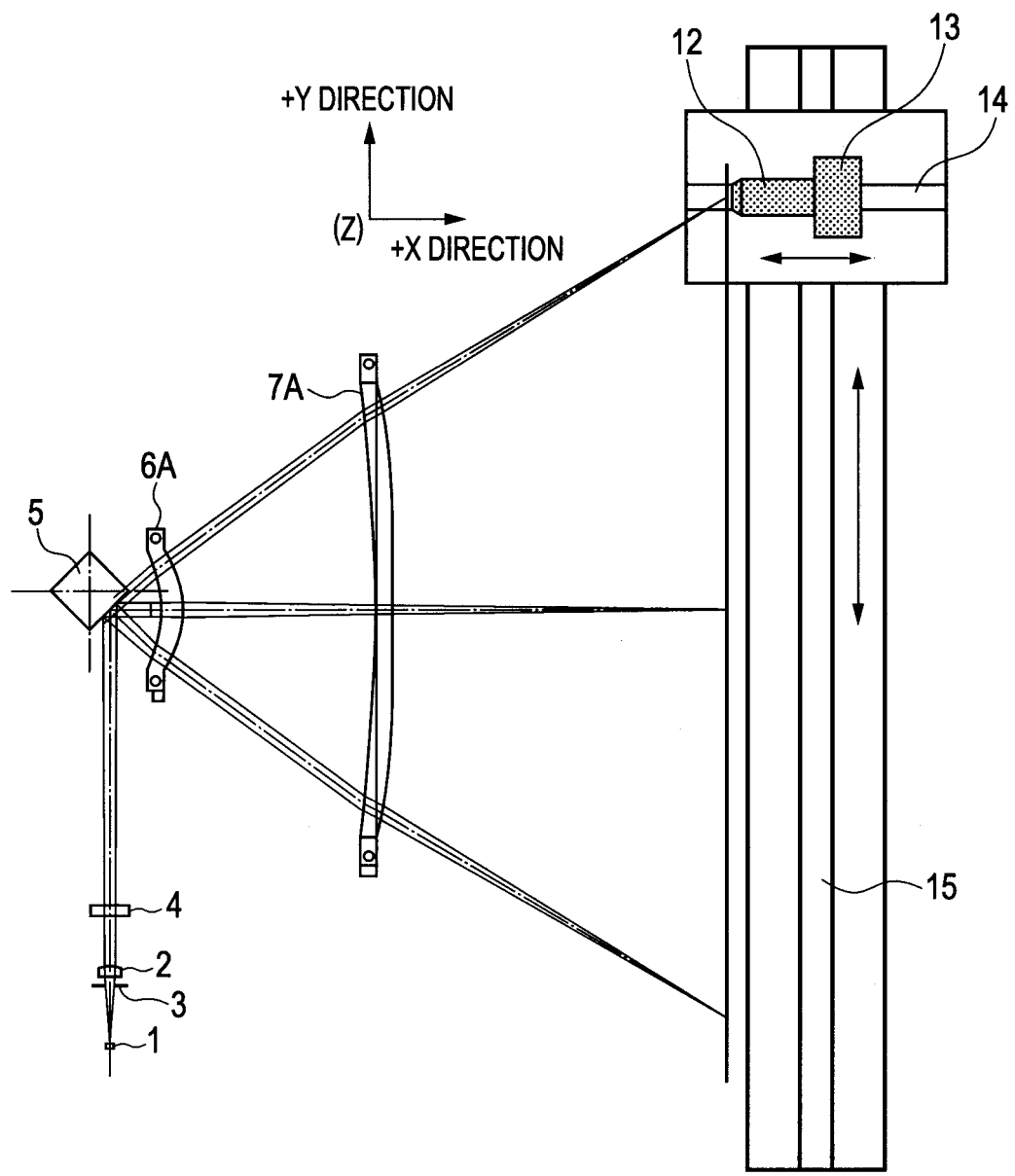
FIG. 6 is a diagram illustrating an outline of an optical performance evaluation tool for evaluating optical performances of the imaging optical element.

However, in the steps performed so far, only the shape error in lens contour at the central position of the sub scanning direction is evaluated, and the shape evaluation is not performed for portions through which light beams actually pass. For such reason, concurrently with the shape measurement, the evaluation of optical performances is performed for the lens in question (focal point deviation amount measuring step). In order to evaluate the optical performances, such an evaluation tool (optical performance evaluation device) as illustrated in FIG. 6 is manufactured. In order to obtain the same optical arrangement as in the configuration of the optical scanning device, the evaluation tool has a semiconductor laser 1, a collimator lens 2, a cylindrical lens 4, a polygon mirror (deflection unit) 5, and imaging optical elements 6A and 7A arranged on a flat plate. Then, by allowing the imaging optical elements 6A and 7A to be replaced, the optical performances of all lenses can be evaluated. As to an observation system, an objective lens 12 and a CCD camera 13 are arranged at positions at which the distance from the light emitting point of the semiconductor laser 1 is the same as the surfaces 8 of the photosensitive drums.

The observation system (the objective lens 12 and the CCD camera 13) is moved in the X direction (direction of arrows of a rail 14), in the Y direction (direction of arrows of a rail 15), and in the Z direction of FIG. 6. Then, spot diameters (PSF and LSF) and peak light amounts in the main scanning direction and the sub scanning direction are measured at respective positions. Specifically, the observation system is moved to an image height (image height in the main scanning direction) for which measurement is to be performed, and then, the angle of the polygon mirror (deflection unit) 5 is set to an angle calculated from the fθ coefficients of the imaging optical elements 6A and 7A so that a spot obtained by emitting light from the semiconductor laser 1 is located within an observation area of the CCD camera 13.

Figure 7:
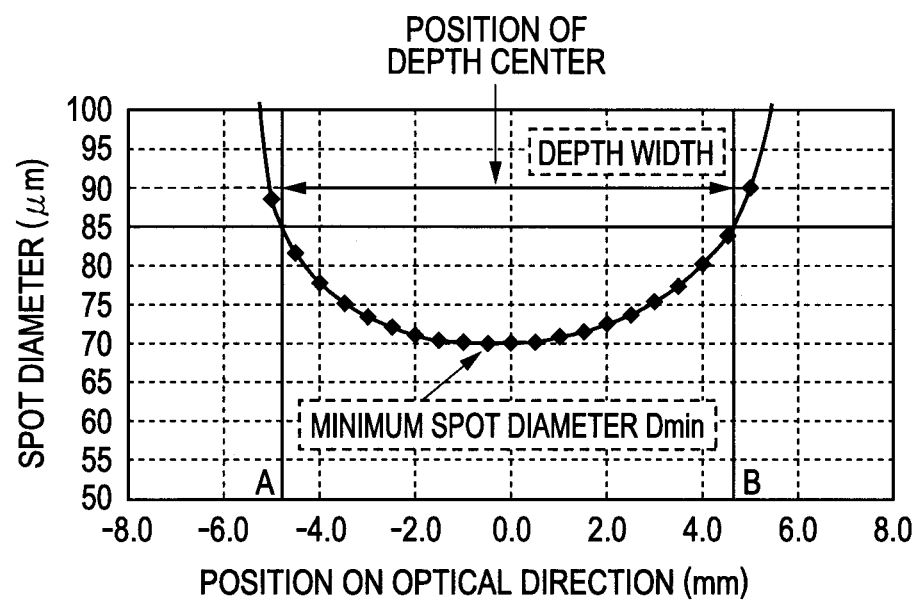
FIG. 7 is a graph showing a defocus characteristic of a spot diameter of a light beam on a surface to be scanned.
Figure 8:
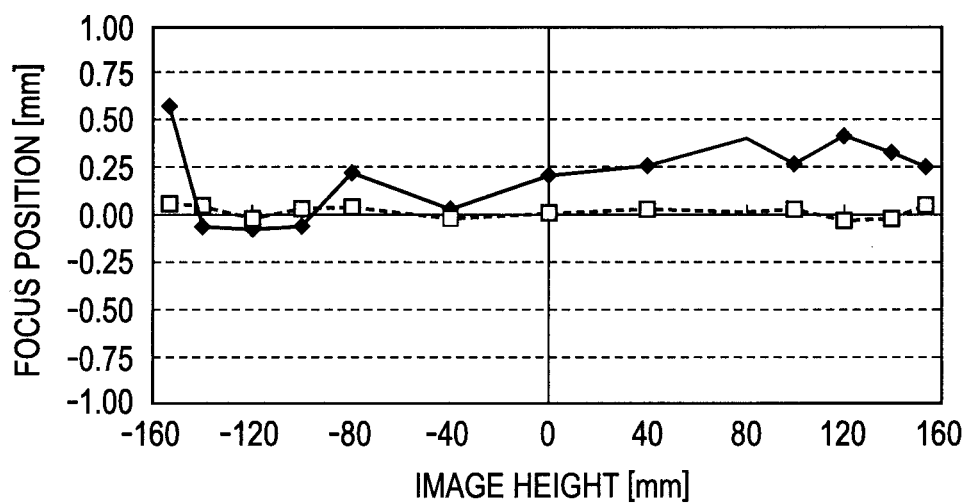
FIG. 8 is an explanatory graph comparing a depth center position of the imaging optical element evaluated by the optical performance evaluation tool and a design value.

Subsequently, while being moved in the X direction with a regular pitch, the observation system is moved in the Y direction and the Z direction so that the position of gravitational center of the spot is always located at the center of the CCD camera 13. By outputting, on a personal computer, the position of the observation system and the spot diameter obtained this way, a defocus characteristic of the spot diameter (focal position deviation amount) at a particular image height as illustrated in FIG. 7 can be observed. Then, based on the defocus characteristic, the X coordinate values of points A and B, at which an upper limit standard of the spot diameter in the main scanning direction (or in the sub scanning direction) is exceeded, are calculated. Then, the average of the points A and B is set as a depth center (focus position) (focal position deviation amount), and the focus positions at several evaluation image heights are determined as illustrated in FIG. 8. The solid line of FIG. shows the focus positions obtained when the imaging optical elements 6A and 7A were actually measured, and the dotted line shows the focus positions obtained based on the design values. The difference (deviation amount) between the actual measured value and the design value is an amount possibly attributed to, for example, an internal factor (such as GI) of the imaging optical elements 6A and 7A, a difference between the position of the shape evaluation and the passing position of the light beam, or an error in shape evaluation. Further, by outputting irradiation positions in the main scanning direction and the sub scanning direction at a designed image plane position based on the positional information of the observation system, the fθ characteristic and the amount of scanning line curvature can be evaluated.

In this embodiment, as illustrated in FIG. 1, the plurality of light beams, which has been deflected by the deflection unit 5 and travels toward the different surfaces 8A, 8B, 8C, and 8D to be scanned, passes through different positions of the imaging optical elements 6A, 7A, and 7B (6'A, 7"A, and 7"B) in the sub scanning direction. For this reason, the light beams traveling toward the respective surfaces to be scanned receive different degrees of influences caused by, for example, the refractive index distribution inside the imaging optical element and the warp of the imaging optical element in the sub scanning direction. Hence, the conventional optical evaluation using only one light beam passing state cannot attain mold correction processing that is satisfactory for all surfaces to be scanned.

To address this, in this embodiment, as illustrated in FIGS. 9A to 9D, four types (four patterns) of optical performance evaluation tools are manufactured, and the mirror-finish insert is corrected based on results obtained by performing evaluations for all (four patterns) of the light beam passing states of FIG. 1 reaching the respective surfaces 8A to 8D to be scanned.

Figure 9A:
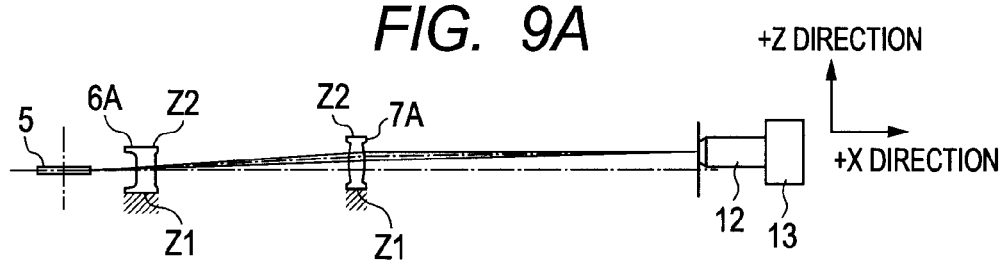
FIG. 9A illustrates a layout of an optical performance evaluation tool.

FIG. 9A illustrates an evaluation tool for reproducing a state in which the light beam Ra of FIG. 1 passes toward the surface 8A to be scanned. In general, the imaging optical element is provided with a reference seating surface for mounting to the cabinet. In the case of the light beam Ra traveling toward the surface 8A to be scanned, the imaging optical elements 6A and 7A are both configured so that seating surfaces Z1 abut on the cabinet. With the evaluation tool, the same mounting state as that of the actual product is provided, and hence influences caused by, for example, a deviation in distance from a seating surface Z to the optical axis of the lens can also be evaluated.

Figure 9B:
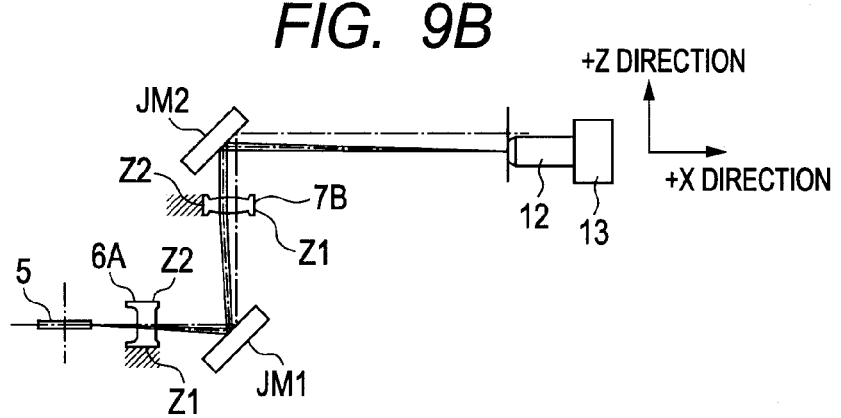
FIG. 9B illustrates a layout of an optical performance evaluation tool.

Similarly, in FIG. 9B, an evaluation tool has two reflecting mirrors JM1 and JM2 arranged therein, and a state in which the light beam Rb of FIG. 1 passes toward the surface 8B to be scanned is reproduced. Further, FIG. 9C reproduces a state in which the light beam R'b of FIG. 1 passes toward the surface 8C to be scanned. FIG. 9D reproduces a state in which the light beam R'a of FIG. 1 passes toward the surface 8D to be scanned.

The number of reflecting mirrors between the imaging optical elements 6A and 7A is zero, and the number of reflecting mirrors between the imaging optical elements 6A and 7B is one (odd number), there being a parity difference in the number of reflecting mirrors. If the number of reflecting mirrors between the imaging optical elements 6A and 7B is two (even number), the light beam Rb passes through the seating surface Z1 side of the imaging optical element 7B. This state is the same as the light beam passing state reaching the surface 8A to be scanned, which is obtained when there is no reflecting mirror. When the numbers of reflecting mirrors are all even numbers or odd numbers and the arrangement is symmetrical with respect to the deflector (deflection unit) 5, there are two patterns of the light beam passing states. However, when the numbers of reflecting mirrors are different in parity, there are more light beam passing states, that is, four patterns, as shown in a table below.

Table 1 below provides a summary of a relationship between the passing positions of each light beam at the lenses and the evaluation tool.

TABLE 1

Figure 9C:
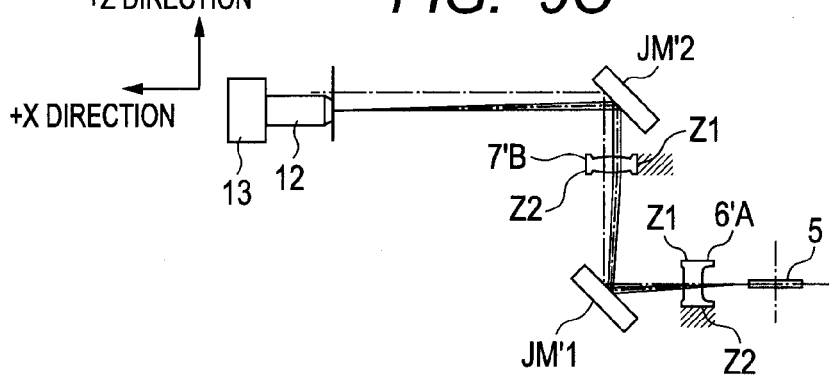
FIG. 9C illustrates a layout of an optical performance evaluation tool.
Figure 9D:
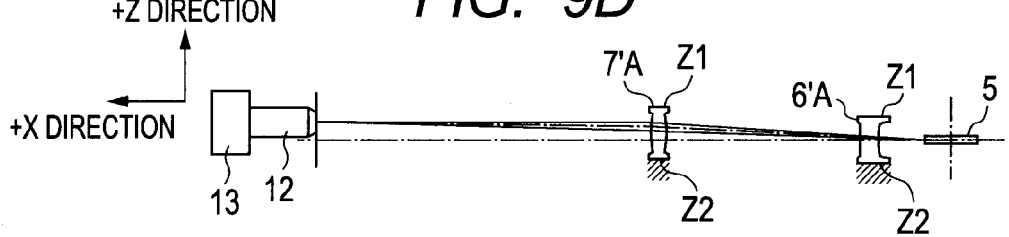
FIG. 9D illustrates a layout of an optical performance evaluation tool.

| Surface to be scanned | Light beam | Passing position of light beam 6A (6'A) | 7A(B) 7'A(B) | Evaluation tool FIG. 9 |
|---|---|---|---|---|
| 8A | Ra | Seating surface Z2 side | Seating surface Z2 side | FIG. 9A |
| 8B | Rb | Seating surface Z1 side | Seating surface Z2 side | FIG. 9B |
| 8C | R'b | Seating surface Z2 side | Seating surface Z1 side | FIG. 9C |

TABLE 1-continued

| Surface to be scanned | Light beam | Passing position of light beam 6A (6'A) | 7A(B) 7'A(B) | Evaluation tool FIG. 9 |
|---|---|---|---|---|
| 8D | R'a | Seating surface Z1 side | Seating surface Z1 side | FIG. 9D |

Figure 10A:
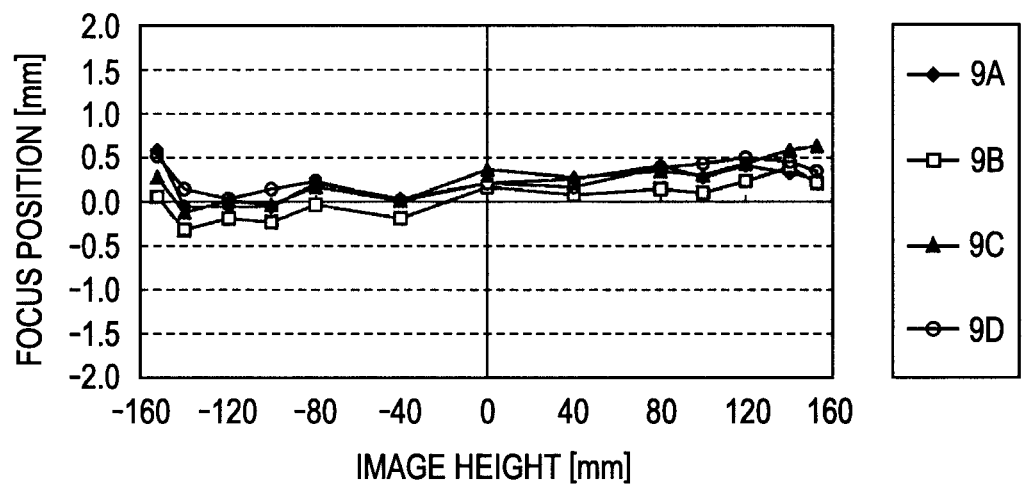
FIG. 10A is a graph showing an amount of curvature of field of the imaging optical element before a second correction according to the first embodiment of the present invention.
Figure 10B:
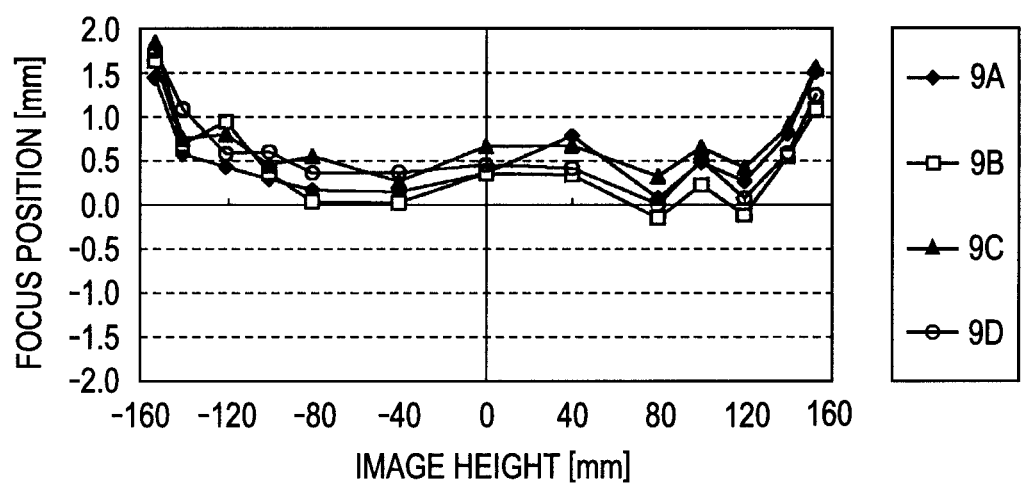
FIG. 10B is a graph showing an amount of curvature of field of the imaging optical element before the second correction according to the first embodiment of the present invention.
Figure 11:
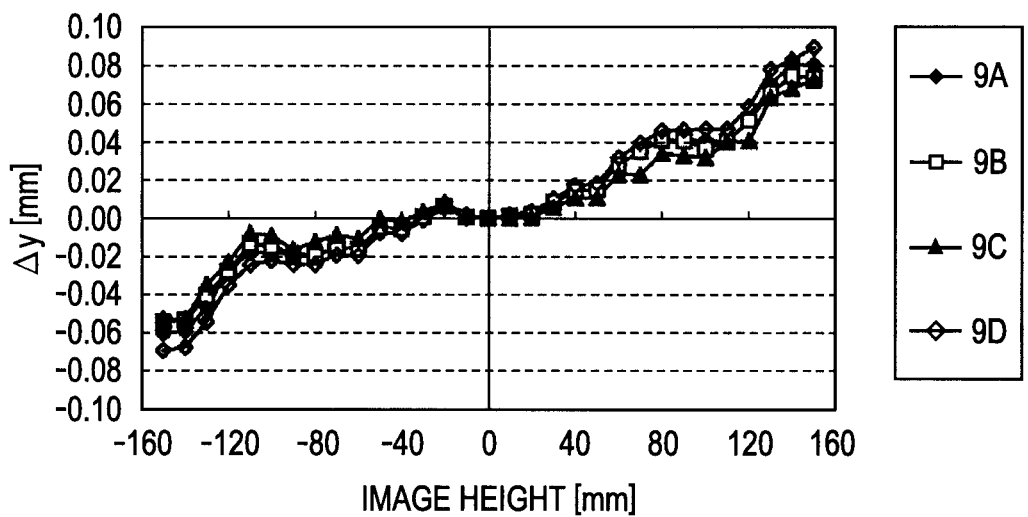
FIG. 11 is a graph showing an fθ characteristic of the imaging optical element before the second correction according to the first embodiment of the present invention.
Figure 12:
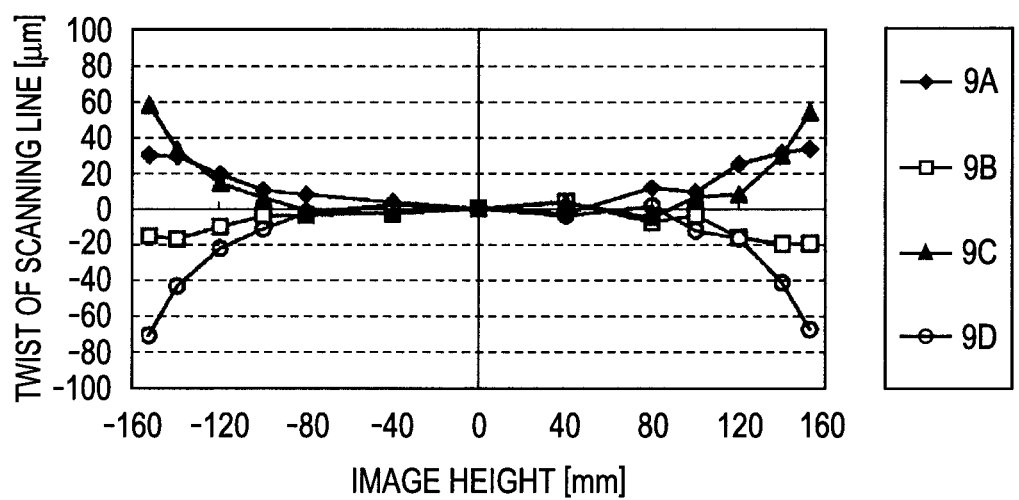
FIG. 12 is a graph showing scanning line curving of the imaging optical element before the second correction according to the first embodiment of the present invention.

FIG. 10A is obtained by plotting, for each image height, the depth centers in the main scanning direction which were measured in the light beam passing states of FIGS. 9A to 9D (main scanning curvature of field) (irradiation position deviation amount). Similarly, FIG. 10B is obtained by plotting, for each image height, the depth centers in the sub scanning direction (sub scanning curvature of field). FIG. 11 is obtained by plotting a difference between an actual measured imaging position in the main scanning direction on the surface to be scanned and an ideal image height defined by y=fθ (fθ characteristic) (irradiation position deviation amount). FIG. 12 is obtained by plotting, for each image height, an imaging position in the sub scanning direction on the surface to be scanned (scanning line curvature). The positive direction of the ordinate of FIG. 12 corresponds to the +Z direction of FIGS. 9A to 9D. As shown in those graphs, though completely the same lenses were measured, there are fluctuations in the main scanning curvature of field and the sub scanning curvature of field among the light beam passing states. This was conceivably caused by, for example, the refractive index distribution inside the lens, the error in surface shape between different passing positions of the light beams, and the error in lens seating surface, which are described above.

As to the scanning line curving (scanning line curvature) of FIG. 12, the fluctuations, including the curving directions, are large partly because the lenses per se are mounted upside down with respect to the evaluation tools (compare FIG. 9A and FIG. 9D). However, the major reason is that the curving directions vary among the evaluation tools depending on what caused the scanning line curving.

Table 2 provides a summary of a relationship between major causes which lead to the scanning line curving and the signs of the directions of the scanning line curving occurring in the respective evaluation tools. For example, when the sub scanning curvature of field has occurred to cause the scanning line curving in the positive direction in the evaluation tool of FIG. 9A (the imaging position is shifted in the positive direction with increasing distance from the axis), the scanning line curving in the positive direction occurs in FIG. 9D as well. On the other hand, when measurement is performed with the evaluation tools of FIG. 9B and FIG. 9C, the scanning line curving in the negative direction is observed. Further, when the scanning line is curved in the positive direction due to the warp of the imaging optical elements 7A and 7B in the sub scanning direction, the curving in the negative direction is observed in FIG. 9D because the lenses are placed upside down. The rest of the table is completed in the same manner, and the relationship as shown in Table 2 is obtained.

TABLE 2

| Evaluation tool | Sub scanning curvature of field | Warp of G1 lens | Warp of G2 lens |
|---|---|---|---|
| FIG. 9A | + | + | + |
| FIG. 9B | − | + | − |
| FIG. 9C | − | − | + |
| FIG. 9D | + | − | − |

Described so far are the actual measured values of the main scanning curvature of field, the sub scanning curvature of field, the fθ characteristic, and the scanning line curving, which were measured by using the evaluation tools of FIGS. 9A to 9D.

Figure 13A:
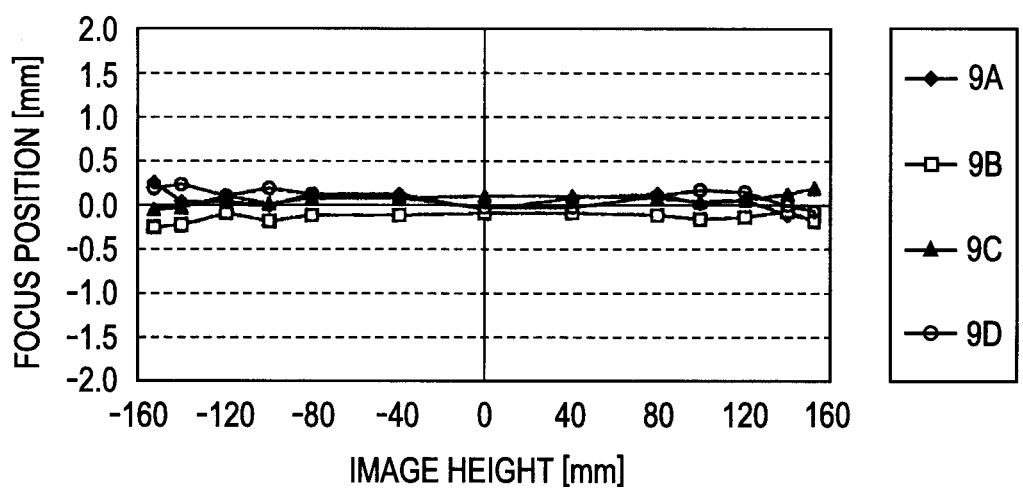
FIG. 13A is a graph showing the amount of the curvature of field of the imaging optical element after the second correction (center value) according to the first embodiment of the present invention.
Figure 13B:
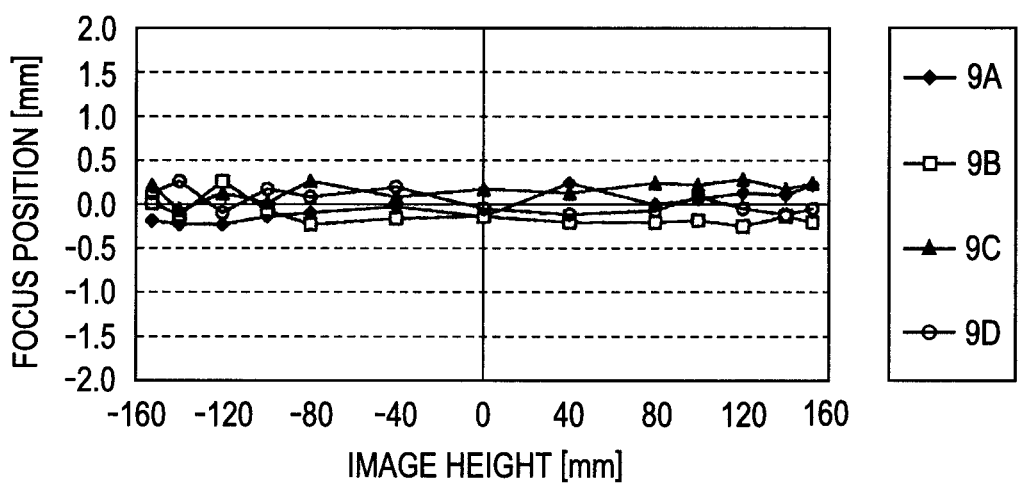
FIG. 13B is a graph showing the amount of the curvature of field of the imaging optical element after the second correction (center value) according to the first embodiment of the present invention.
Figure 14A:
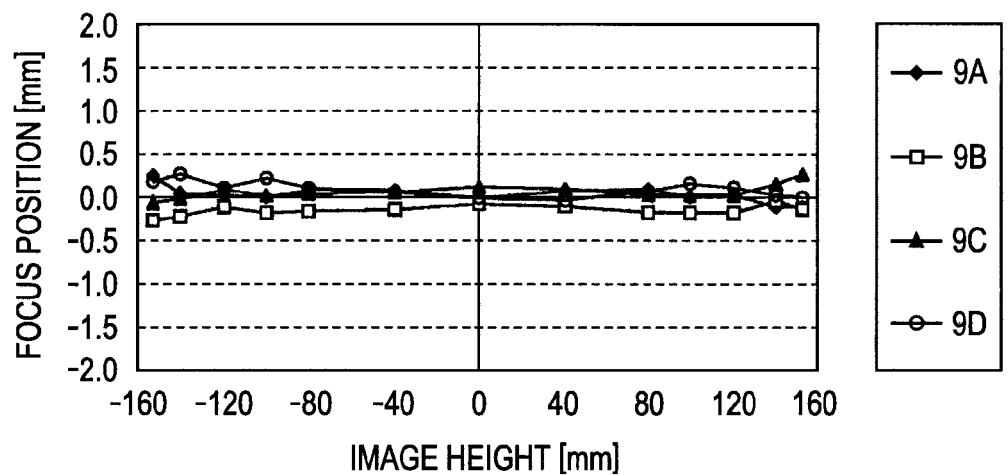
FIG. 14A is a graph showing the amount of the curvature of field of the imaging optical element after the second correction (average value) according to the first embodiment of the present invention.
Figure 14B:
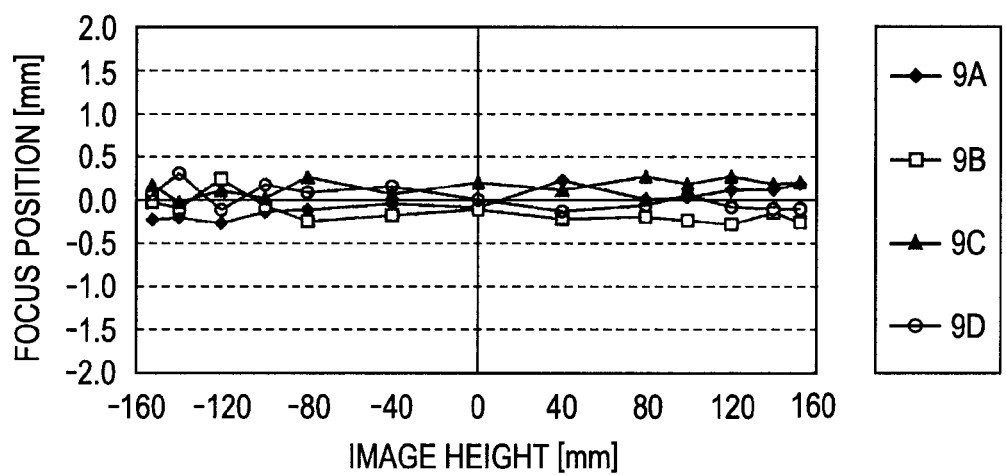
FIG. 14B is a graph showing the amount of the curvature of field of the imaging optical element after the second correction (average value) according to the first embodiment of the present invention.

Next, described are results obtained by correcting the respective optical performances based on the actual measured values obtained by the evaluation tools. FIG. 13A shows a result of correcting the shape of the mirror-finish insert so that the center value of the main scanning curvature of field at each image height, which was measured in FIG. 10A, was returned to the design value (approximately zero). FIG. 13B shows a result of correction performed in the same manner based on the center value of the sub scanning curvature of field. Similarly, FIGS. 14A and 14B show results of correction performed based on the average values of the main scanning curvature of field and the sub scanning curvature of field, respectively.

Figure 15A:
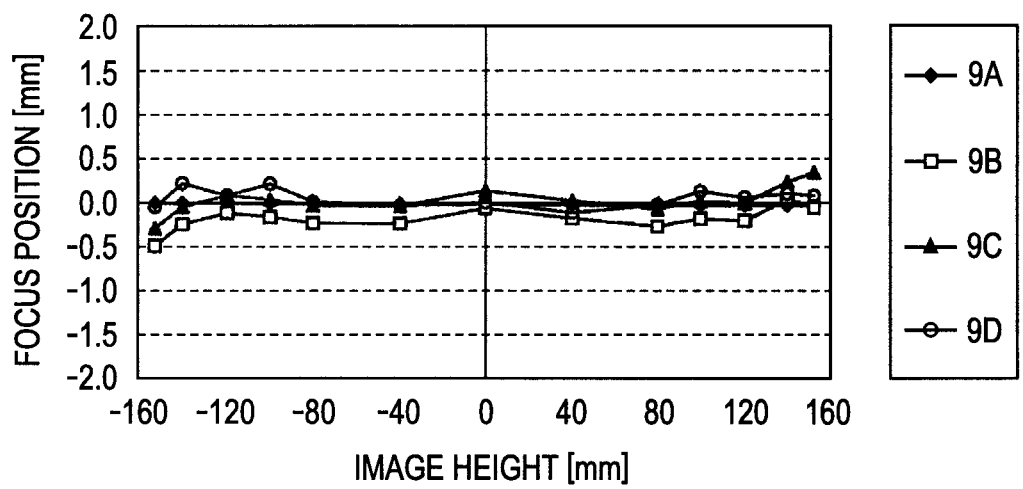
FIG. 15A is a graph showing the amount of the curvature of field of the imaging optical element after the second correction (layout of FIG. 9A) according to a comparative example of the first embodiment of the present invention.
Figure 15B:
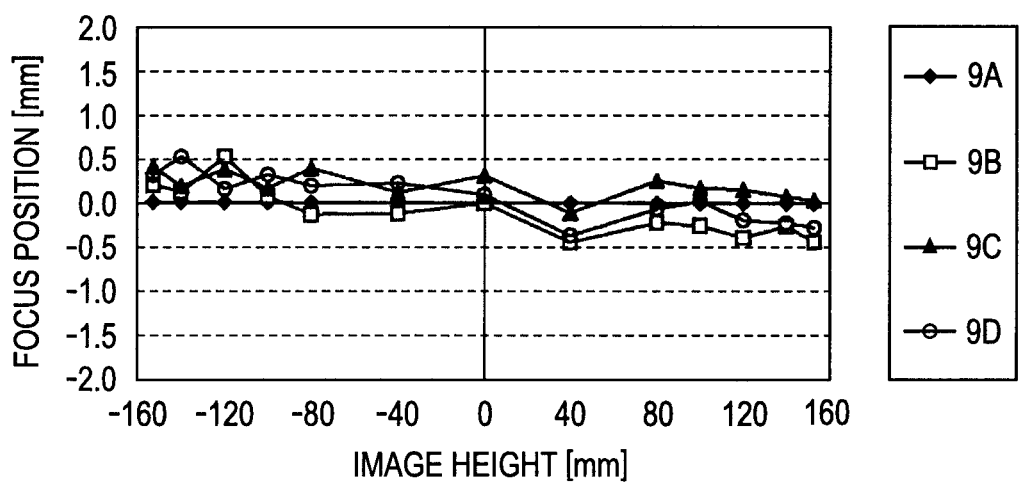
FIG. 15B is a graph showing the amount of the curvature of field of the imaging optical element after the second correction (layout of FIG. 9A) according to the comparative example of the first embodiment of the present invention.
Figure 16:
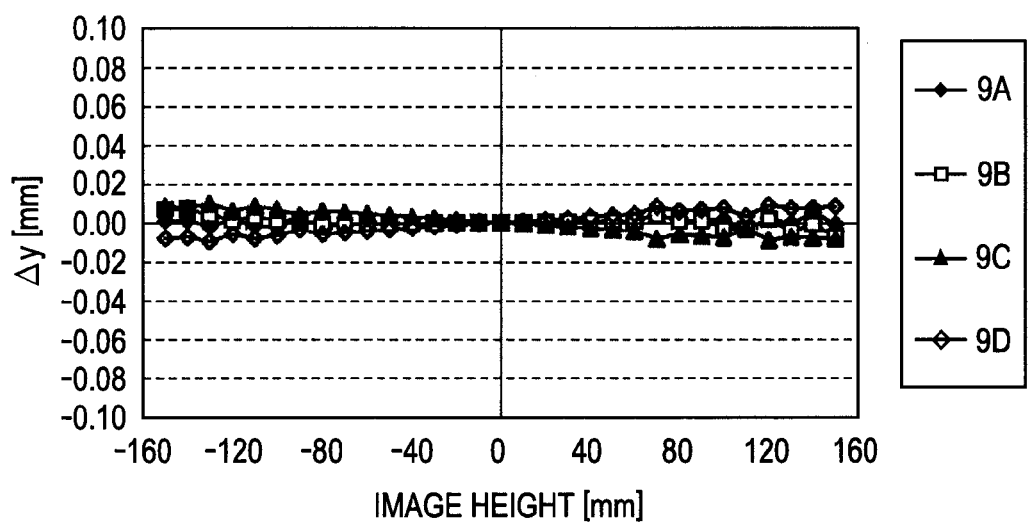
FIG. 16 is a graph showing the fθ characteristic of the imaging optical element after the second correction (center value) according to the first embodiment of the present invention.

In FIGS. 13A, 13B, 14A, and 14B, no light beam passing state of FIGS. 9A to 9D has the error corrected to zero at all of the image heights, but the deviation amounts from zero have been made smaller in a balanced manner. On the other hand, FIGS. 15A and 15B show conventionally-practiced correction based on measurement data obtained from one light beam passing state on the lens surface. FIG. 15A is obtained by correcting the measurement results for the light beam passing state of FIG. 9A to zero, and it can be seen that large correction residuals exist at an image height of −153 mm for the light beam passing state of FIG. 9B and at an image height of +153 mm for the light beam passing state of FIG. 9C. Further, in FIG. 15B, similarly, the error is corrected to zero for the light beam passing state of FIG. 9A. However, when the light beam passing states of FIGS. 9B to 9D are averaged, it can be seen that the inclination of the image plane in the negative direction remains in a direction from the negative image height toward the positive image height. FIG. 16 shows a result of performing, with respect to the fθ characteristics measured in FIG. 11, correction based on the center values of the respective light beam passing states. This shows that the mirror-finish insert has been corrected to a level that poses no problem in terms of actual image.

As described above, in the optical scanning device employed for a color image forming apparatus, the same lenses are used at the various positions of the light beam passing states, and hence it is preferred that the mirror-finish insert be corrected in a balanced manner among all of the light beam passing states, rather than improvement in just one light beam passing state. Thus, it can be understood that the conventionally-practiced evaluation which uses the measurement data obtained at positions of one light beam passing state is insufficient.

Next, correction of the mirror-finish insert performed with respect to the scanning line curving is described. The scanning line curving is one of the most important optical performances among the optical performances of the optical scanning device employed for the color image forming apparatus. For easier understanding, the graph of FIG. 12 is summarized into Table 3, which shows numerical values obtained by plotting the scanning line curving at each image height.

TABLE 3

| | Actual measured value | | | | | | | | | | | | | |
|---|---|---|---|---|---|---|---|---|---|---|---|---|---|---|
| | Image height (mm) | | | | | | | | | | | | | |
| | −153 | −140 | −120 | −100 | −80 | −40 | 0 | 40 | 80 | 100 | 120 | 140 | 153 | max-min |
| FIG. 9A | 29.8 | 29.1 | 19.2 | 10.3 | 7.7 | 3.3 | 0.0 | −2.8 | 11.7 | 9.5 | 25.1 | 31.4 | 33.6 | 36.4 |
| FIG. 9B | −15.8 | −17.3 | −10.5 | −4.3 | −3.9 | −2.4 | 0.0 | 3.7 | −7.9 | −3.5 | −16.4 | −19.7 | −19.6 | 23.4 |
| FIG. 9C | 57.9 | 32.4 | 14.0 | 5.7 | −1.2 | −2.9 | 0.0 | 3.2 | −5.1 | 6.5 | 8.1 | 30.0 | 54.1 | 63.0 |
| FIG. 9D | −71.9 | −44.2 | −22.6 | −11.7 | −2.7 | 2.0 | 0.0 | −4.1 | 1.3 | −12.5 | −16.8 | −41.8 | −68.1 | 73.9 |

Figure 4:
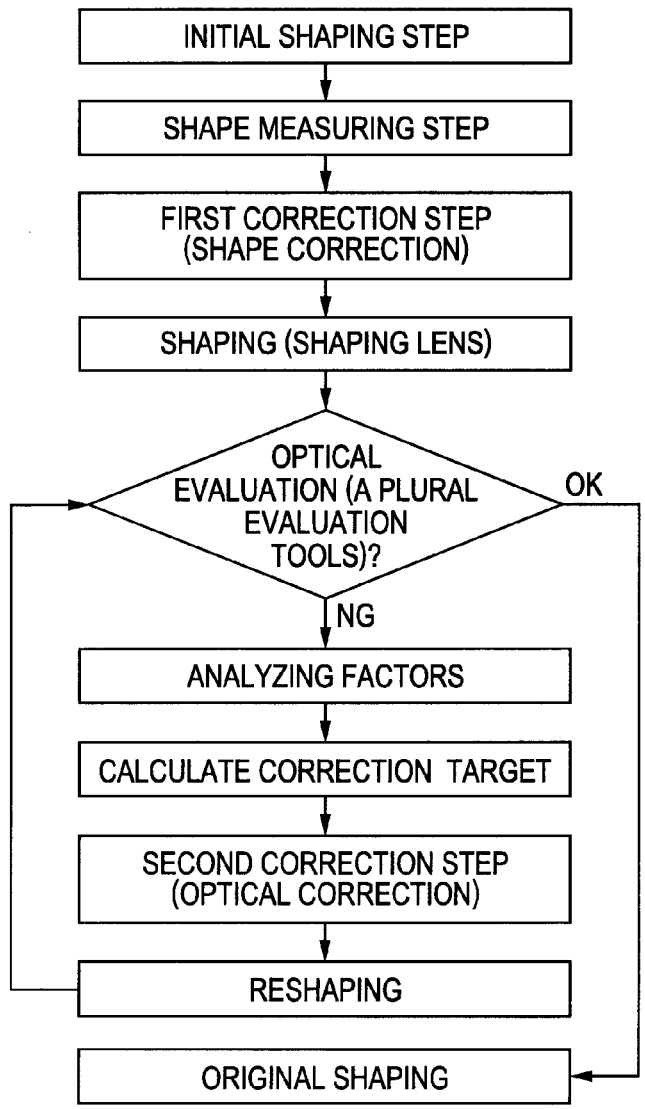
FIG. 4 is an explanatory diagram of a flow of manufacturing an imaging optical element according to the first embodiment of the present invention.

Here, based on the relationship between each factor and the sign shown in Table 2, factor analysis is performed for the actual measured values (factor analysis of FIG. 4). The scanning line curving caused by the sub scanning curvature of field is represented by dZs(y), the scanning line curving caused by the warp of the imaging optical element 6A or 6'A is represented by dZ1(y), and the scanning line curving caused by the imaging optical element 7A (7'B) or 7'A (7'B) is represented by dZ2(y). Further, the actual measured values obtained by the evaluation tools of FIGS. 9A to 9D are represented by dZA(y), dZB(y), dZC(y), and dZD(y), respectively. In this case, the following relational expressions are satisfied:

$$dZs=(dZA+dZB)/2;$$

$$dZ1=(dZA+dZD)/2;\text{ and}$$

$$dZ2=(dZA+dZC)/2.$$

By performing the factor analysis based on those relational expressions, the scanning line curving can be separated into components as shown in Table 4.

TABLE 4

| | Factor analysis | | | | | | | | | | | | |
|---|---|---|---|---|---|---|---|---|---|---|---|---|---|
| | Image height (mm) | | | | | | | | | | | | |
| | −153 | −140 | −120 | −100 | −80 | −40 | 0 | 40 | 80 | 100 | 120 | 140 | 153 |
| dZs | −21.1 | −7.5 | −1.7 | −0.7 | 2.5 | 2.7 | 0.0 | −3.4 | 6.5 | −1.5 | 4.2 | −5.2 | −17.2 |
| dZ1 | 7.0 | 5.9 | 4.3 | 3.0 | 1.9 | 0.5 | 0.0 | 0.5 | 1.9 | 3.0 | 4.3 | 5.9 | 7.0 |
| dZ2 | 43.8 | 30.7 | 16.6 | 8.0 | 3.3 | 0.2 | 0.0 | 0.2 | 3.3 | 8.0 | 16.6 | 30.7 | 43.8 |

Based on Table 4, the mirror-finish insert is corrected with respect to each component. As for dZs, as described above, when the sub scanning curvature of field itself is corrected, the scanning line curving is corrected as well. As for dZ1 and dZ2, correction can be performed by curving the meridional line of each lens so that the warp of the lens is canceled, or using such a plane that causes a tilt angle in the sub scanning direction to be changed in a longitudinal direction of the lens (in the main scanning direction).

[Shape Equation of Curving Meridional Line]

$$Z=G_0+G_1Y+G_2Y^2+G_3Y^3+G_4Y^4+\ldots \quad \text{(Equation 5)}$$

[Shape Equation of Surface Tilt in Sub Scanning Direction]

$$X=(H_0+H_1Y+H_2Y^2+H_3Y^3+H_4Y^4+\ldots)Z \quad \text{(Equation 6)}$$

Figure 17:
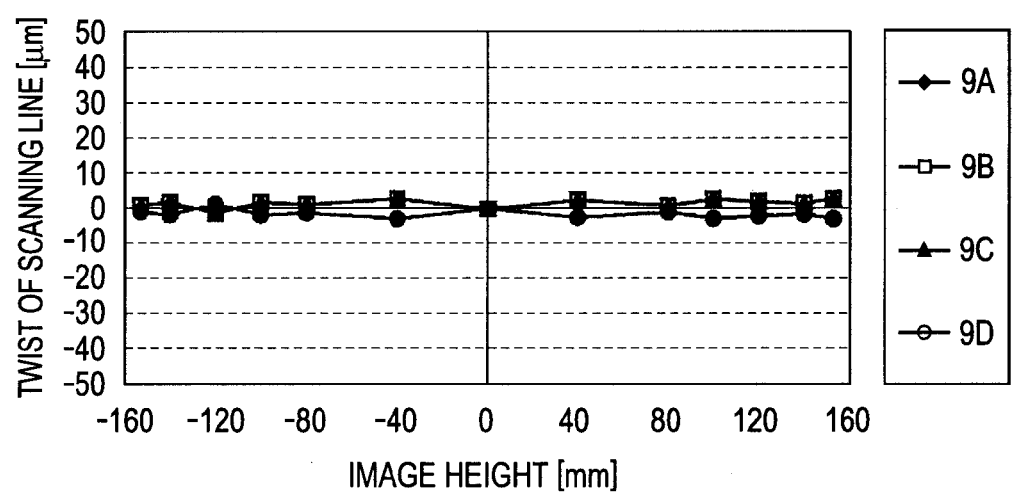
FIG. 17 is a graph showing the scanning line curving after correction by analyzing factors according to the first embodiment of the present invention.

Results of such correction are shown in FIG. 17 and Table 5.

TABLE 5

| | Correction by analyzing factors | | | | | | | | | | | | | |
|---|---|---|---|---|---|---|---|---|---|---|---|---|---|---|
| | Image height (mm) | | | | | | | | | | | | | |
| | −153 | −140 | −120 | −100 | −80 | −40 | 0 | 40 | 80 | 100 | 120 | 140 | 153 | max-min |
| FIG. 9A | −1.0 | −1.8 | 1.4 | −1.8 | −1.3 | −2.9 | 0.0 | −2.5 | −1.0 | −2.8 | −2.2 | −1.5 | −2.9 | 4.3 |
| FIG. 9B | 1.0 | 1.8 | −1.4 | 1.8 | 1.3 | 2.9 | 0.0 | 2.5 | 1.0 | 2.8 | 2.2 | 1.5 | 2.9 | 4.3 |
| FIG. 9C | 1.0 | 1.8 | −1.4 | 1.8 | 1.3 | 2.9 | 0.0 | 2.5 | 1.0 | 2.8 | 2.2 | 1.5 | 2.9 | 4.3 |
| FIG. 9D | −1.0 | −1.8 | 1.4 | −1.8 | −1.3 | −2.9 | 0.0 | −2.5 | −1.0 | −2.8 | −2.2 | −1.5 | −2.9 | 4.3 |

The error is not completely eliminated because the average value of FIGS. 9A to 9D is used when the sub scanning curvature of field is corrected, and thus there remains an amount attributed to a deviation between each light beam passing state and the average value. However, a difference between a maximum value and a minimum value is corrected to 4.3 μm, which is about 1/10 of one pixel (42.3 μm) in the case of 600 dpi.

Figure 18:
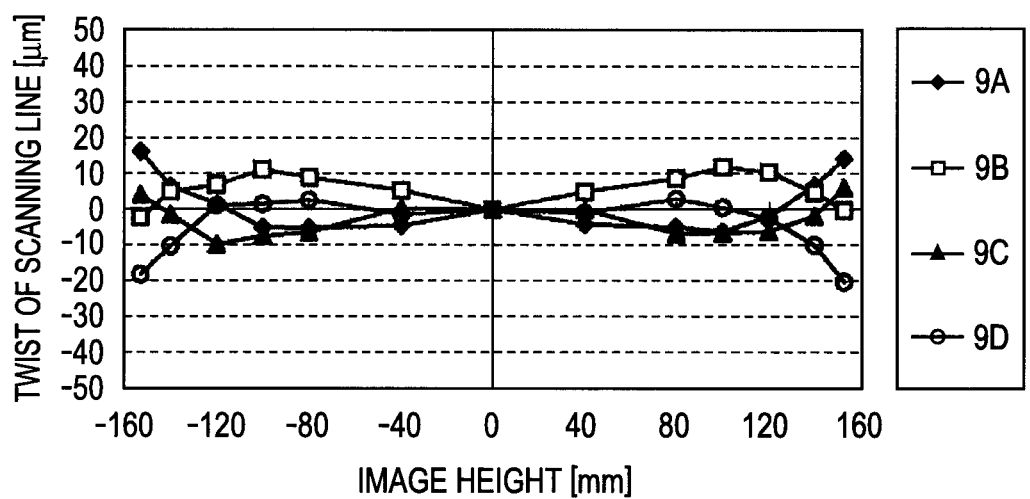
FIG. 18 is a graph showing the scanning line curving after correction without analyzing factors according to a comparative example of the present invention.

On the other hand, FIG. 18 and Table 6 show results obtained by performing an evaluation with the evaluation tool illustrated in FIG. 9A and correcting the mirror-finish insert based on the assumption that the error thus obtained is attributed to the imaging optical element 7A, 7B, 7'A, or 7'B, which is a major factor among generation causes of the curving.

imaging optical element obtained by remolding (remolding of FIG. 4) are measured by using the evaluation tools of FIGS. 9A to 9D (optical evaluation), and then, it is determined whether or not each of the optical characteristics, such as the focus error, the fθ characteristic, and the scanning line curving, falls within the allowable range, compared to the design values. As a result of the determination, when each of the optical characteristics falls within the allowable range (OK), the correction is finished (original molding of FIG. 4). On the other hand, when each of the optical characteristics is out of the allowable range (NG), the optical characteristics are measured again, and the following step is repeated until each of the optical characteristics falls within the allowable range. That is, based on results of the measurement performed again,

TABLE 6

Correction based on assumption that error is caused by imaging optical element 7A

| | Image height (mm) | | | | | | | | | | | | | |
|---|---|---|---|---|---|---|---|---|---|---|---|---|---|---|
| | −153 | −140 | −120 | −100 | −80 | −40 | 0 | 40 | 80 | 100 | 120 | 140 | 153 | max-min |
| FIG. 9A | 16.3 | 6.6 | 1.6 | −5.2 | −5.3 | −4.5 | 0.0 | −4.1 | −5.0 | −6.2 | −2.0 | 6.9 | 14.3 | 22.4 |
| FIG. 9B | −2.2 | 5.1 | 7.0 | 11.2 | 9.2 | 5.5 | 0.0 | 5.1 | 8.8 | 12.2 | 10.6 | 4.8 | −0.3 | 14.4 |
| FIG. 9C | 4.2 | −1.4 | −9.8 | −7.5 | −6.5 | 0.4 | 0.0 | 0.0 | −6.8 | −6.6 | −6.2 | −1.7 | 6.1 | 15.9 |
| FIG. 9D | −18.2 | −10.3 | 1.1 | 1.5 | 2.7 | −1.3 | 0.0 | −0.9 | 3.0 | 0.6 | −2.4 | −10.0 | −20.2 | 23.2 |

The scanning line curving was corrected for the light beam passing state of FIG. 9A, but because the scanning line curving was not separated into the components, the sub scanning curvature of field was corrected, resulting in occurrence of the scanning line curving. Further, for the other states, there remains the scanning line curving, which is about ½ the size of one pixel. In the color image forming apparatus, an overlapping displacement of the scanning lines (color shift) causes conspicuous changes in color accuracy and color tone, and hence it is significantly important to correct the scanning line curving as much as possible.

As can be understood, it is significantly important to perform the factor analysis of the scanning line curving and the correction by using the center value or the average value obtained by measuring correction targets of the curvature of field in the plurality of light beam passing states. Further, by mounting the lens to the evaluation tool in the same state as the state in which the lens is actually mounted to the cabinet (by using the same seating surface as the seating surface which abuts on the cabinet), the evaluation of the optical performances and the correction of the mirror-finish insert can be performed in consideration of an error factor of the seating surface of the imaging optical element as well.

Based on the correction amount determined as described above, a difference between the shape function of a new redesigned optical functional surface and the shape function of the design values is calculated by using Equations 3, 4, 5, and 6 (correction target calculation of FIG. 4). By applying the function thus obtained to the mirror-finish insert, the optical characteristics exhibited by the imaging optical element molded after correction can be made closer to the design values (second correction step of FIG. 4). On this occasion, if the ratio of the length in the main scanning direction of the optical functional surface of the molded lens to the length in the main scanning direction of the mirror-finish insert is known, the parts concerning the coefficient of Y in Equations 3, 4, 5, and 6 are multiplied by this ratio depending on the order of Y. This is preferred because the optical performances of the molded imaging optical element are made closer to the design values.

Then, based on the newly-determined function, the mirror-finish insert is reprocessed. The optical performances of the the shape of a particular optical functional surface is redesigned, and the corrected shape of the mirror-finish insert is reviewed.

In this embodiment, the shrinkage of the lens was considered anisotropically, but in some cases, it is better to consider the shrinkage of the lens isotropically depending on the shape. Further, when the shrinkage ratio of a resin used is small, there is no need to consider the effect of the shrinkage in determining the shape of the mirror-finish insert. Further, in this embodiment, with regard to the correction of the main scanning curvature of field and the correction of the sub scanning curvature of field, the correction was performed with one correction shape by using at least one of the center value and the average value of four measured values. The present invention is not limited thereto, and the correction may be performed with four separate correction shapes by using four measured values. In this case, the mirror-finish insert needs to be processed by using such a processing shape that the curvature in the main scanning direction and the curvature in the sub scanning direction are independent of each other at a position in the sub scanning direction of the lenses such as the imaging optical elements 6A and 7A. With this configuration, in principle, the fluctuations in optical performances among the four patterns of the light beam passing states can be further suppressed.

Further, instead of separately performing the shape evaluation for a first correction and the optical evaluation for a second correction as in this embodiment, the shape evaluation and the optical evaluation may be performed at the same time to process the mirror-finish insert based on results thereof. Further, after the mirror-finish insert is corrected based only on the shape measurement data as described in this embodiment (first correction of FIG. 4), if the evaluated optical performances in the four patterns of the light beam passing states are within standards, there is no need to perform further correction of the mirror-finish insert.

The important point is as follows. That is, while the optical performances of the imaging optical element have been hitherto guaranteed for only one pattern of the light beam passing state, the optical performances are guaranteed for the four patterns of the light beam passing states which are used in the actual optical scanning device. With this configuration, percent defectives can be reduced with ease for all of the four stations, including stations which have been excluded so far from the evaluation.

Further, the application of the present invention is not limited to the optical scanning device of this embodiment, which is configured so that, in the respective stations used in the optical scanning device, the light beams enter different positions of the same lenses in the sub scanning direction. The present invention is also applicable to lenses with different contour shapes which are arranged at the same position within one optical scanning device. For example, as illustrated in FIG. 1, in contrast to the imaging optical element 7A, the light beam does not pass through the seating surface Z1 side of the imaging optical element 7B, and thus the contour shape on the seating surface Z1 side may be cut off to obtain such a lens that is suppressed in height in the sub scanning direction. Similarly, in contrast to the imaging optical element 7'A, the light beam does not pass through the seating surface Z2 side of the imaging optical element 7'B, and thus the contour shape on the seating surface Z2 side may be cut off. In this manner, when the lenses are configured to have a minimum height just enough for the light beam to pass through, the shapes of the lens surfaces of the imaging optical elements 7A and 7'A are defined by the same aspherical equation, but the lens shapes are different from each other. In an optical scanning device constituted by imaging optical elements of such type, too, it is important to perform the evaluation in the same light beam passing state and in the same mounting state of the lens as in the optical scanning device in order to preferably guarantee the optical performances for all stations.

[Second Embodiment]

Figure 19:
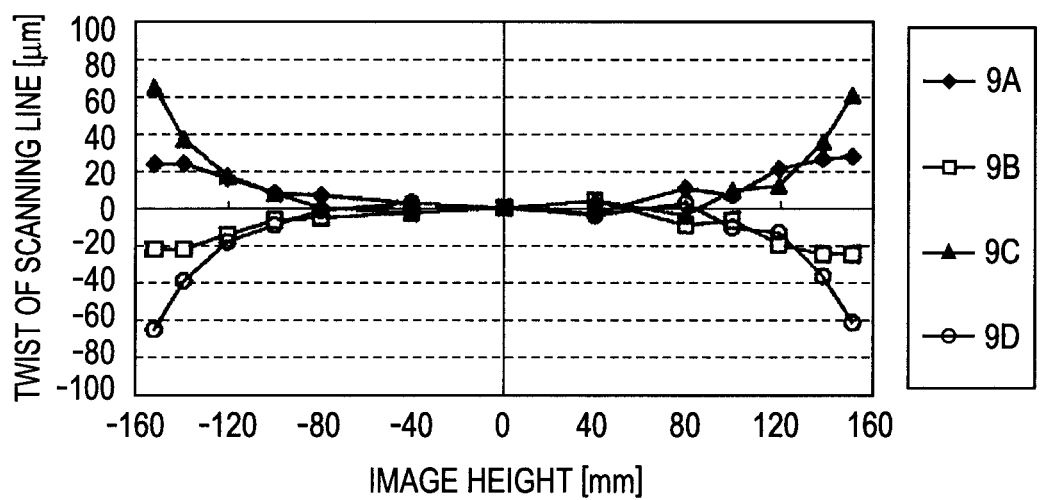
FIG. 19 is a graph showing the scanning line curving before correction of a mirror-finish insert according to a second embodiment of the present invention.

FIG. 19 is a graph showing the scanning line curving obtained before the mirror-finish insert is corrected according to a second embodiment of the present invention, and Table 7 shows numerical value data obtained by plotting the scanning line curving.

When the imaging optical element 6A, which is arranged closer to the deflector, has a smaller refractive power in the sub scanning direction as in this embodiment, the sensitivity of the scanning line curving caused by the warp of the imaging optical element in the sub scanning direction is low. Hence, even if the warp has occurred in the imaging optical element 6A to some extent, the scanning line curving observed on the surface to be scanned may be actually ignored. On the other hand, in general, the imaging optical element 7A, which is the closest to the surface to be scanned, is thinner, and is also longer in the main scanning direction, compared to the imaging optical element 6A arranged closer to the deflector. Thus, the imaging optical element 7A is liable to warp in the sub scanning direction. Further, by decreasing an imaging magnification in the sub scanning direction, uniformity for the sub scanning imaging magnification is secured more easily, and the sensitivities of pitch unevenness and of other optical performances are decreased. For this reason, the imaging optical element 7A is generally provided with a stronger refractive power than the imaging optical element 6A. As a result, there arises a drawback that, when the imaging optical element 7A is warped in the sub scanning direction, the scanning line curving becomes large. Here, the scanning line curving caused by the warp of the imaging optical element 6A in the sub scanning direction is set to 1 μm. When the sensitivity of the scanning line curving caused by the imaging optical element 6A is low as in this case, there is no need to measure the scanning-line curving in all patterns of the light beam passing states, and hence the number of the evaluation devices (the number of the light beam passing states) can be reduced.

As described in the first embodiment, the component of the scanning line curving caused by the sub scanning curvature of field is determined from data obtained through the measurements of FIGS. 9A and 9B. The component of the scanning line curving caused by the imaging optical element 7A is determined from data obtained through the measurements of

TABLE 7

Actual measured value

| | Image height (mm) | | | | | | | | | | | | | |
|---|---|---|---|---|---|---|---|---|---|---|---|---|---|---|
| | −153 | −140 | −120 | −100 | −80 | −40 | 0 | 40 | 80 | 100 | 120 | 140 | 153 | max-min |
| FIG. 9A | 23.8 | 24.0 | 15.5 | 7.7 | 6.1 | 2.9 | 0.0 | −3.2 | 10.1 | 6.9 | 21.4 | 26.4 | 27.6 | 30.8 |
| FIG. 9B | −21.8 | −22.3 | −14.2 | −6.8 | −5.5 | −2.8 | 0.0 | 3.3 | −9.5 | −6.1 | −20.1 | −24.7 | −25.6 | 28.9 |
| FIG. 9C | 63.9 | 37.4 | 17.7 | 8.3 | 0.5 | −2.5 | 0.0 | 3.6 | −3.5 | 9.1 | 11.8 | 35.1 | 60.1 | 67.4 |
| FIG. 9D | −65.9 | −39.1 | −18.9 | −9.2 | −1.0 | 2.4 | 0.0 | −3.7 | 3.0 | −9.9 | −13.1 | −36.7 | −62.1 | 68.9 |

In this embodiment, a refractive power (power) φs1 of the imaging optical element 6A in the sub scanning direction is smaller than a refractive power φs2 of the imaging optical element 7A in the sub scanning direction. For example, assumed is a case in which φs1 is equal to or smaller than 20% of φs2.

$|\phi s1| < 0.2 \times |\phi s2|$

Figure 20:
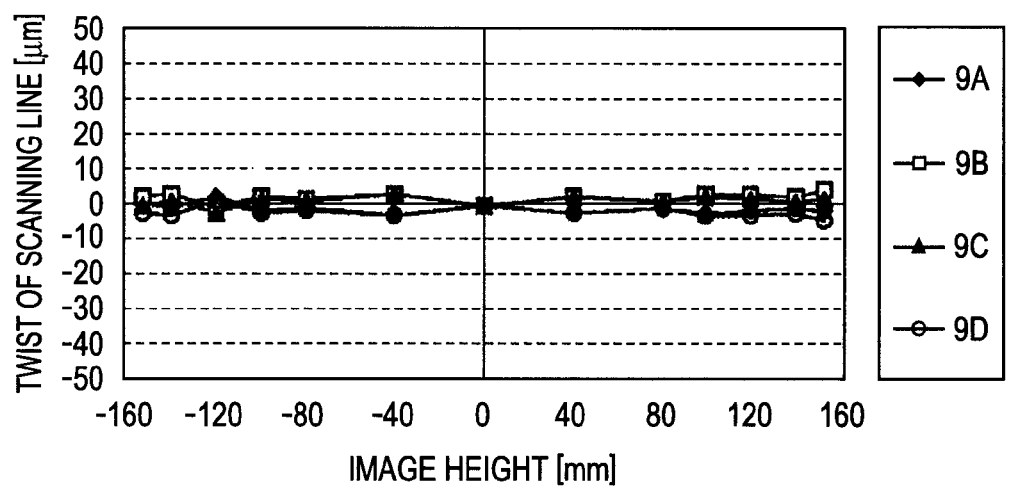
FIG. 20 is a graph showing the scanning line curving after correction by analyzing factors, excluding an imaging optical element 6A, according to the second embodiment of the present invention.

FIGS. 9A and 9C. Accordingly, the measurement in the light beam passing state of FIG. 9D may be omitted. FIG. 20 and Table 8 show results obtained by correcting only the component of the sub scanning curvature of field and the component caused by the warp of the imaging optical element 7A without performing the measurement in the light beam passing state of FIG. 9D.

TABLE 8

Correction of component of sub scanning curvature of field and component of imaging optical element 7A

| | Image height (mm) | | | | | | | | | | | | | |
|---|---|---|---|---|---|---|---|---|---|---|---|---|---|---|
| | −153 | −140 | −120 | −100 | −80 | −40 | 0 | 40 | 80 | 100 | 120 | 140 | 153 | max-min |
| FIG. 9A | 0.02 | −1.01 | 1.99 | −1.42 | −1.05 | −2.86 | 0.00 | −2.46 | −0.72 | −2.38 | −1.59 | −0.70 | −1.94 | 4.85 |
| FIG. 9B | 1.99 | 2.69 | −0.76 | 2.27 | 1.60 | 3.00 | 0.00 | 2.60 | 1.27 | 3.23 | 2.83 | 2.38 | 3.95 | 4.70 |

TABLE 8-continued

Correction of component of sub scanning curvature of field and component of imaging optical element 7A

| | Image height (mm) | | | | | | | | | | | | |
|---|---|---|---|---|---|---|---|---|---|---|---|---|---|
| | −153 | −140 | −120 | −100 | −80 | −40 | 0 | 40 | 80 | 100 | 120 | 140 | 153 | max-min |
| FIG. 9C | −0.02 | 1.01 | −1.99 | 1.42 | 1.05 | 2.86 | 0.00 | 2.46 | 0.72 | 2.38 | 1.59 | 0.70 | 1.94 | 4.85 |
| FIG. 9D | −1.99 | −2.69 | 0.76 | −2.27 | −1.60 | −3.00 | 0.00 | −2.60 | −1.27 | −3.23 | −2.83 | −2.38 | −3.95 | 4.70 |

Figure 21:
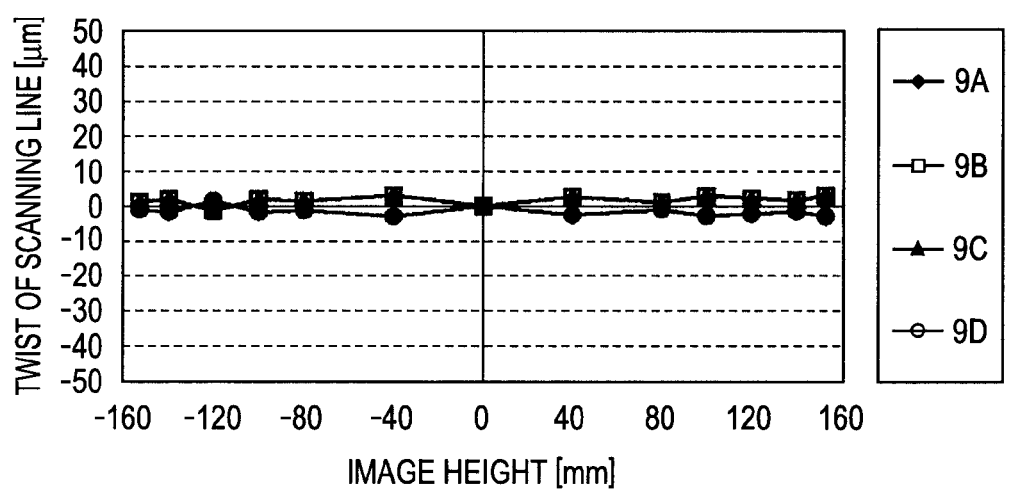
FIG. 21 is a graph showing the scanning line curving after correction by analyzing all factors according to a comparative example of the second embodiment of the present invention.

Further, for comparison to the result above, FIG. 21 and Table 9 show results obtained by performing correction for each of all factors in the same manner as in the first embodiment.

TABLE 9

Correction by analyzing all factors

| | Image height (mm) | | | | | | | | | | | | |
|---|---|---|---|---|---|---|---|---|---|---|---|---|---|
| | −153 | −140 | −120 | −100 | −80 | −40 | 0 | 40 | 80 | 100 | 120 | 140 | 153 | max-min |
| FIG. 9A | −0.99 | −1.85 | 1.37 | −1.85 | −1.32 | −2.93 | 0.00 | −2.53 | −0.99 | −2.80 | −2.21 | −1.54 | −2.94 | 4.32 |
| FIG. 9B | 0.99 | 1.85 | −1.37 | 1.85 | 1.32 | 2.93 | 0.00 | 2.53 | 0.99 | 2.80 | 2.21 | 1.54 | 2.94 | 4.32 |
| FIG. 9C | 0.99 | 1.85 | −1.37 | 1.85 | 1.32 | 2.93 | 0.00 | 2.53 | 0.99 | 2.80 | 2.21 | 1.54 | 2.94 | 4.32 |
| FIG. 9D | −0.99 | −1.85 | 1.37 | −1.85 | −1.32 | −2.93 | 0.00 | −2.53 | −0.99 | −2.80 | −2.21 | −1.54 | −2.94 | 4.32 |

Referring to Tables 8 and 9, as for the difference between the maximum value and the minimum value of the imaging position in the sub scanning direction, it can be seen that the difference is 4.85 μm when the component of the imaging optical element 6A is omitted, and that the difference is 4.32 μm when the correction is performed for all the factors. This shows that a difference between the different correction methods is less than 1 μm, which is an insignificant amount. As can be understood from the above, when the imaging optical element 6A, which is arranged closer to the deflector and has a shorter lens length in the main scanning direction, has a sufficiently small refractive power in the sub scanning direction, the omission of the measurement does not leave such a level of correction residual that poses a problem in practical terms. Therefore, the optical performances only need to be evaluated for the imaging optical element which has a higher sensitivity of the scanning line curving and is the longest in the main scanning direction, in all patterns of the light beam passing states which are actually used in the optical scanning device.

According to the embodiments described above, the optical performances of the imaging optical element manufactured by the injection molding are measured and evaluated in a plurality of light beam passing states, and the correction shape is calculated based on the average value or the center value of a plurality of pieces of the measurement data thus obtained, to thereby perform the correction processing on the mirror-finish insert. This enables guaranteeing the optical performances, such as a focal point deviation and an imaging position deviation, in all actual usage states of the optical scanning device, and hence a lens of high accuracy formed of a plastic material can be obtained. Further, based on the plurality of pieces of the measurement data, the factors causing the deterioration of the optical performances are separated from one another for each imaging optical element, and the correction shape of the optical functional surface is calculated for each imaging optical element on a factor basis, to thereby perform the correction processing on the mirror-finish insert. This enables guaranteeing the optical performances, such as the imaging position deviation in the sub scanning direction in particular, in all actual usage states of the optical scanning device.

[Color Image Forming Apparatus]

Figure 22:
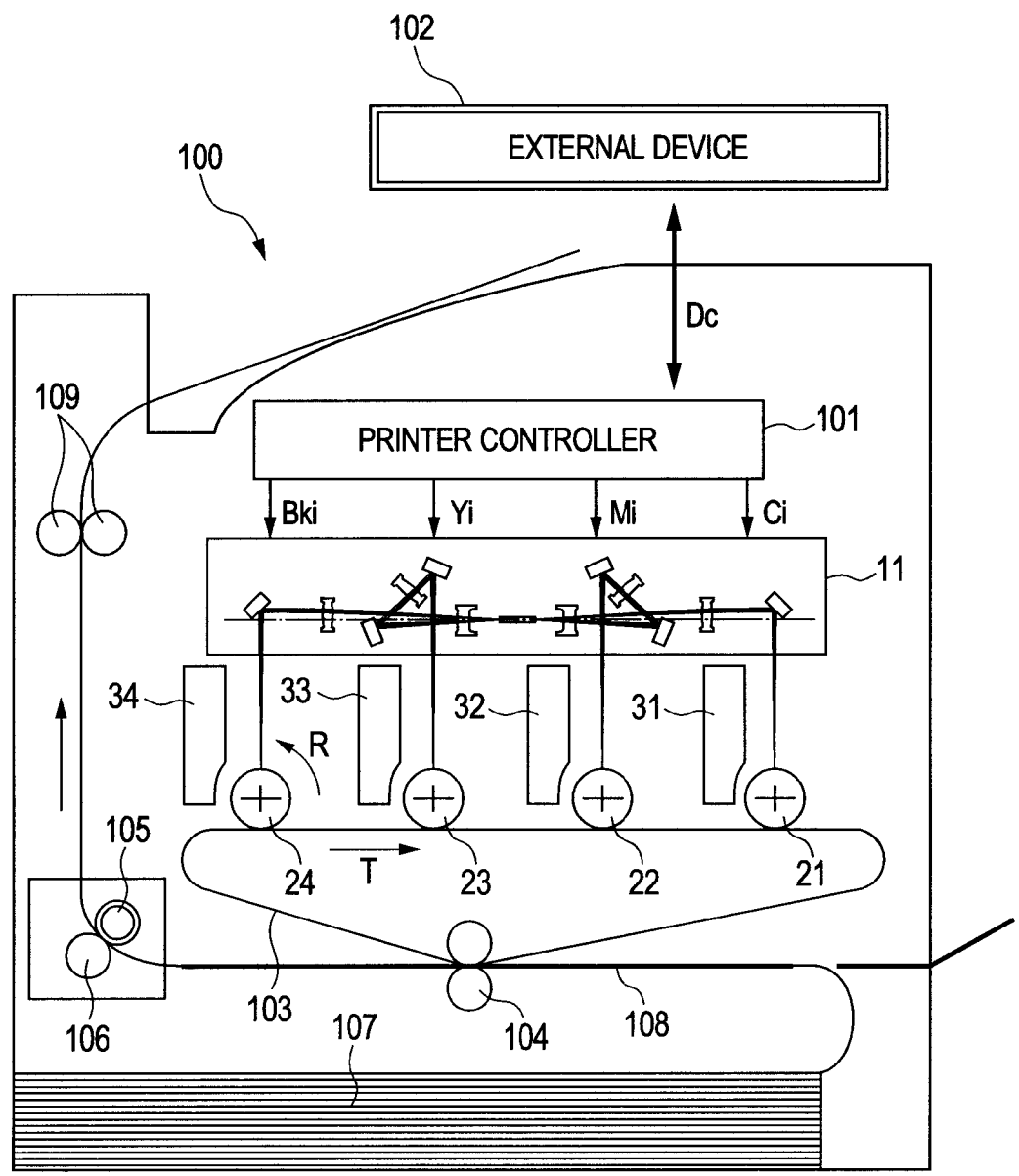
FIG. 22 is a diagram illustrating a color image forming apparatus according to the present invention.

FIG. 22 is a sectional view illustrating a main portion in the sub scanning direction of the color image forming apparatus according to the embodiments of the present invention. FIG. 22 illustrates a color image forming apparatus 100. Code data (color signal) Dc is input to the color image forming apparatus 100 from an external device 102 such as a personal computer. The code data Dc is converted to pieces of color image data Yi (yellow), Mi (magenta), Ci (cyan), and Bki (black) by a printer controller 101 provided inside the color image forming apparatus 100. Then, the pieces of color image data are input to an optical scanning device 11 having the configuration described in the first and second embodiments. Then, light beams modulated according to the pieces of image data Yi, Mi, Ci, and Bki are emitted from the optical scanning device 11, and the photosensitive surfaces of photosensitive drums 21 to 24 are scanned with the light beams in the main scanning direction.

The photosensitive drums 21 to 24, serving as electrostatic latent image bearing members (photosensitive members), are rotated counterclockwise (R direction) by motors (not shown). Then, along with the rotation, with respect to the light beams, the photosensitive surfaces of the photosensitive drums 21 to 24 are moved in the sub scanning direction, which is orthogonal to the main scanning direction. Above the photosensitive drums 21 to 24, there are provided charging rollers (not shown) for uniformly charging the surfaces of the photosensitive drums 21 to 24, with the charging rollers abutting on the surfaces of the photosensitive drums 21 to 24. Then, the surfaces of the photosensitive drums 21 to 24 charged by the charging rollers are irradiated with the light beams scanned by the optical scanning device 11.

As described above, the light beams have been modulated based on the pieces of the image data Yi, Mi, Ci, and Bki, and the irradiation of the light beams causes electrostatic latent images to be formed on the surfaces of the photosensitive drums 21 to 24. The electrostatic latent images are developed, as visible toner images, by developing devices 31 to 34 arranged downstream of the rotational direction of the photosensitive drums 21 to 24 beyond the irradiation positions of the light beams in such a manner that the developing devices 31 to 34 abut on the photosensitive drums 21 to 24. The toner images of four colors, which have been developed by the developing devices 31 to 34, are temporarily transformed onto an intermediate transfer belt 103 disposed so as to be opposed to the photosensitive drums 21 to 24 below the photosensitive drums 21 to 24, to thereby form a color image (color toner image). Then, the color toner image formed on the intermediate transfer belt 103 is transferred by transfer rollers (transfer portion) 104 onto a sheet 108, being a material of transfer target. The sheet 108 is received in a sheet cassette 107.

The sheet 108 onto which the unfixed toner image has been transferred is further conveyed to a fixing device. The fixing device is constituted by a fixing roller 105, which includes a fixing heater (not shown) therein, and a pressure roller 106 arranged so as to be in press-contact with the fixing roller 105. The sheet 108 conveyed from the transfer portion 104 is heated while being pressed by a press-contact portion formed between the fixing roller 105 and the pressure roller 106, to thereby fix the unfixed toner image on the sheet 108. Then, the sheet 108 having the image fixed thereon is delivered out of the color image forming apparatus 100. A registration sensor 109 reads registration marks of Y, M, C, and Bk formed on the intermediate transfer belt 103, to thereby detect a color shift amount of each color. Results of the detection are fed back to the optical scanning device 11 so as to form a high quality color image free from color shift.

Though not illustrated in FIG. 22, in addition to the data conversion described above, the printer controller 101 controls respective components in the color image forming apparatus 100, a polygon motor in the optical scanning device 11, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-138258, filed Jun. 17, 2010, which is hereby incorporated by reference herein in its entirety.

What is claimed is:

1. A method of manufacturing imaging optical elements which have the same optical performance and are to be used in an optical scanning apparatus,
   the optical scanning apparatus comprising:
      a plurality of light source units;
      an incident optical system for causing a plurality of light beams emitted from the plurality of light source units to enter the same deflection surface of a deflection unit from an oblique direction with respect to a sub scanning direction; and
      a plurality of imaging optical systems for guiding the plurality of light beams deflected by the same deflection surface of the deflection unit to respective surfaces to be scanned which correspond to the plurality of light beams,
   in the plurality of imaging optical systems, such imaging optical elements that are arranged optically at the same position and have the same optical performance being configured to have different light beam passing states in the sub scanning direction, depending on the plurality of light beams corresponding to the respective surfaces to be scanned,
   the method of manufacturing imaging optical elements, comprising:
      measuring, with respect to the imaging optical elements having the same optical performance, the optical performance at each of a plurality of positions of the different light beam passing states;
      calculating a correction shape of an optical functional surface of the imaging optical element based on a deviation amount from a design value of the optical functional surface of the imaging optical element, the deviation amount being determined based on a plurality of pieces of measurement data obtained in the measurement of the optical performance;
      performing correction processing on a shape of a mirror-finish insert of a mold for molding, which corresponds to the optical functional surface of the imaging optical element, based on the correction shape of the optical functional surface obtained in the calculation of the correction shape; and
      performing molding by using the mirror-finish insert subjected to the correction processing.

2. A method of manufacturing imaging optical elements according to claim 1,
   wherein the plurality of imaging optical systems each comprises a plurality of the imaging optical elements, and
   wherein the measurement of the optical performance comprises measuring, in all light beam passing states, the optical performance of an imaging optical element which is longest in a main scanning direction among the plurality of the imaging optical elements.

3. A method of manufacturing imaging optical elements according to claim 1, wherein the measurement of the optical performance comprises evaluating the optical performance in all combinations of the imaging optical elements, in which the light beam passing states are different depending on positions on an optical path along which the imaging optical elements are arranged.

4. A method of manufacturing imaging optical elements according to claim 1,
   wherein one of the plurality of imaging optical systems of the scanning optical system has one of no reflecting mirror and an even number of reflecting mirrors arranged among a plurality of the imaging optical elements, and
   wherein another one of the plurality of imaging optical systems of the scanning optical system has an odd number of reflecting mirrors arranged among a plurality of the imaging optical elements.

5. A method of manufacturing imaging optical elements according to claim 1,
   wherein the measurement of the optical performance comprises measuring the optical performance of the imaging optical element at a plurality of image heights at a position corresponding to the surface to be scanned, and
   wherein the calculation of the correction shape comprises calculating the correction shape of the mirror-finish insert of the mold based on one of an average value and a center value of the plurality of pieces of the measurement data at each of the plurality of image heights.

6. A method of manufacturing imaging optical elements according to claim 1,
   wherein the measurement of the optical performance comprises measuring the optical performance of the imaging optical element at a plurality of image heights at a position corresponding to the surface to be scanned, and
   wherein the calculation of the correction shape comprises calculating different correction shapes for positions of the mirror-finish insert of the mold, corresponding to positions of the imaging optical element through which respective light beams pass, based on the plurality of pieces of the measurement data obtained at the plurality of image heights.

7. A method of manufacturing imaging optical elements according to claim 1, wherein the plurality of pieces of the measurement data, which is obtained with respect to the imaging optical element in a plurality of the light beam passing states in the measurement of the optical performance, comprises at least one of a focal point deviation amount in a main scanning direction and a focal point deviation amount in the sub scanning direction on the surface to be scanned.

8. A method of manufacturing imaging optical elements according to claim 1, wherein the plurality of pieces of the measurement data, which is obtained with respect to the imaging optical element in a plurality of the light beam passing states in the measurement of the optical performance, comprises an irradiation position deviation amount in a main scanning direction on the surface to be scanned.

9. A method of manufacturing imaging optical elements according to claim 1, wherein the calculation of the correction shape comprises analyzing factors each corresponding to the optical performance for each imaging optical element, and calculating the correction shape of the each imaging optical element for each of the factors, based on the plurality of pieces of the measurement data measured with respect to the imaging optical element in a plurality of the light beam passing states in the measurement of the optical performance.

10. A method of manufacturing imaging optical elements according to claim 1, wherein the plurality of pieces of the measurement data, which is obtained with respect to the imaging optical element in a plurality of the light beam passing states in the measurement of the optical performance, comprises an irradiation position deviation amount in the sub scanning direction.

11. An optical performance evaluation method for imaging optical elements which have the same optical performance and are to be used in an optical scanning apparatus, the optical scanning apparatus comprising:
a plurality of light source units;
an incident optical system for causing a plurality of light beams emitted from the plurality of light source units to enter the same deflection surface of a deflection unit from an oblique direction with respect to a sub scanning direction; and
a plurality of imaging optical systems for guiding the plurality of light beams deflected by the same deflection surface of the deflection unit to respective surfaces to be scanned which correspond to the plurality of light beams,
in the plurality of imaging optical systems, such imaging optical elements that are arranged optically at the same position and have the same optical performance being configured to have different light beam passing states in the sub scanning direction, depending on the plurality of light beams corresponding to the respective surfaces to be scanned,
the optical performance evaluation method comprising measuring and evaluating the optical performance of the imaging optical element in a plurality of the light beam passing states.

12. An optical performance evaluation method according to claim 11, wherein the imagine optical element is mounted to an optical performance evaluation device by using the same portion as a portion to be mounted to the optical scanning apparatus.

13. A scanning optical system, comprising an imaging optical element manufactured by the method of manufacturing imaging optical elements according to claim 1.

14. An optical scanning apparatus, comprising the scanning optical system according to claim 13.

15. A color image forming apparatus, comprising:
the optical scanning apparatus according to claim 14; and
a printer controller for converting a color signal input from an external device to pieces of image data on different colors and inputting the pieces of the image data to the optical scanning apparatus.

* * * * *